US008360457B2

(12) United States Patent
Timmons, Jr.

(10) Patent No.: US 8,360,457 B2
(45) Date of Patent: Jan. 29, 2013

(54) TRAILER STEERING MECHANISM

(76) Inventor: Ronald G. Timmons, Jr., Newberry, FL (US)

( * ) Notice: Subject to any disclaimer, the term of this patent is extended or adjusted under 35 U.S.C. 154(b) by 498 days.

(21) Appl. No.: 12/659,823

(22) Filed: Mar. 23, 2010

(65) Prior Publication Data
US 2010/0181743 A1 Jul. 22, 2010

Related U.S. Application Data

(63) Continuation-in-part of application No. 11/783,296, filed on Apr. 6, 2007, now Pat. No. 7,694,993.

(51) Int. Cl.
*B62D 13/04* (2006.01)
*B62D 13/06* (2006.01)

(52) U.S. Cl. ........................................ 280/445
(58) Field of Classification Search ............ 280/442–445
See application file for complete search history.

(56) References Cited

U.S. PATENT DOCUMENTS

| | | | |
|---|---|---|---|
| 1,955,178 A | | 4/1934 | Elwood |
| 2,092,683 A | | 9/1937 | Stidham |
| 2,510,525 A | * | 6/1950 | Smart et al. ............ 280/443 |
| 2,533,553 A | | 12/1950 | Burns |
| 2,929,642 A | | 3/1960 | Dinkel |
| 3,105,704 A | | 10/1963 | Schramm |
| 3,212,793 A | | 10/1965 | Pietroroia |
| 3,753,580 A | | 8/1973 | Folkert |
| 3,834,480 A | * | 9/1974 | McGee ................ 180/419 |
| 4,042,255 A | | 8/1977 | Drewek et al. |
| 4,133,552 A | | 1/1979 | Sheine |
| 4,208,063 A | | 6/1980 | Baker et al. |
| 4,313,616 A | | 2/1982 | Howard |
| 4,345,775 A | | 8/1982 | Merrifield |
| 4,405,147 A | | 9/1983 | Horsman et al. |
| 4,451,058 A | | 5/1984 | Curry |
| 4,720,119 A | | 1/1988 | Ritter |
| 4,824,135 A | * | 4/1989 | McGregor ............ 280/442 |

(Continued)

FOREIGN PATENT DOCUMENTS

| DE | 3538338 | 4/1987 |
|---|---|---|
| DE | 4216543 | 12/1992 |

(Continued)

OTHER PUBLICATIONS

Website, http://www.supertow.co.za/products.html, "The New Generation" 2002 model anti-jacknife steerable trailer, four sheets printed Jan. 16, 2006.

(Continued)

*Primary Examiner* — Paul N Dickson
*Assistant Examiner* — Wesley Potter
(74) *Attorney, Agent, or Firm* — Richard C. Litman

(57) ABSTRACT

The trailer steering mechanism automatically steers the trailer wheels in accordance with the tow vehicle steering and articulation between the tow vehicle and trailer during backing maneuvers to facilitate backing maneuvers and to prevent or greatly reduce the possibility of jackknifing between tow vehicle and trailer. The mechanism includes a pivotally attached steering frame connected between the steerable wheels of the trailer and one or more hydraulic cylinders that, when locked, create a very strong link between the tow vehicle and the trailer and its steering system. An alternative embodiment employs two non-powered hydraulic cylinders in tandem. The cylinders are able to withstand great loads, and more importantly, are able to disengage while under great load without jamming. The cylinders provide links that exert lateral force to the trailer to push or pull the trailer into a turn while backing, in addition to controlling the steering mechanism of the trailer.

19 Claims, 19 Drawing Sheets

U.S. PATENT DOCUMENTS

| | | | |
|---|---|---|---|
| 5,244,226 A | 9/1993 | Bergh | |
| 5,364,117 A | 11/1994 | Keith | |
| 5,382,041 A | 1/1995 | Keith | |
| 5,595,397 A * | 1/1997 | Depault | 280/677 |
| 5,784,967 A | 7/1998 | Lohr | |
| 6,273,446 B1 * | 8/2001 | Paul | 280/448 |
| 6,431,576 B1 | 8/2002 | Viaud et al. | |
| RE37,863 E * | 10/2002 | Depault | 222/383.2 |
| 7,147,241 B2 * | 12/2006 | Beaujot et al. | 280/442 |
| 7,694,993 B2 * | 4/2010 | Timmons, Jr. | 280/442 |
| 2004/0217575 A1 | 11/2004 | Beaujot et al. | |
| 2005/0046146 A1 | 3/2005 | Plante | |
| 2009/0000890 A1 | 1/2009 | Furuya | |

FOREIGN PATENT DOCUMENTS

DE 10236335 2/2003

OTHER PUBLICATIONS

Website, http://www.northerntool.com/webapp/wcs/stores/servlet/ProductDisplay?storeId=6970&productId=200311373&R=200311373, Precision Products 4-Wheel Steerable Dual Axle Trailer Cart, one sheet printed Jan. 16, 2006.

Website, http://www.discount-trailers.com/smart-trailer.htm, "Smart Trailer," three sheets printed on Feb. 5, 2007.

* cited by examiner

TRAILER STEERING MECHANISM

CROSS REFERENCE TO RELATED PATENT APPLICATION

This application is a continuation-in-part of U.S. patent application Ser. No. 11/783,296 filed on Apr. 6, 2007 now U.S. Pat. No. 7,694,993.

BACKGROUND OF THE INVENTION

1. Field of the Invention

The present invention relates generally to vehicle steering systems, and particularly to a trailer steering mechanism for towing a trailer or other towed implement or machine behind a motor vehicle.

2. Description of the Related Art

The towing vehicle and trailer combination is an inherently unstable one during backing maneuvers. Even a simple trailer having a single axle with non-steerable wheels requires some skill by the driver of the towing vehicle during backing maneuvers. This is because of the articulation between the towing vehicle and trailer, which allows the trailer to turn relative to the towing vehicle. Once the trailer begins to turn, even continued straight backing by the towing vehicle will cause the trailer to turn ever more sharply, resulting in the jackknifing of the trailer and towing vehicle in short order.

While the above problem can be overcome by a skilled driver operating a single axle trailer, other trailer configurations can be impossible to back. For example, truck tractors, or other towing vehicles towing multiple articulated trailers in tandem, can only successfully back the single trailer connected directly to the towing vehicle. There is no way for the driver of the towing vehicle to steer both trailers of such a configuration while backing. Another example is the farm wagon-type trailer, having a front axle with steerable wheels and a rear axle with directionally fixed wheels. This combination cannot be backed due to the instability of the steerable front wheels of the trailer, which causes a castering action when backing.

A number of different trailer steering mechanisms have been developed over the years in attempts to solve at least some of the above-described problems.

German Patent No. 3,538,338, published on Apr. 30, 1987, describes (according to the drawings and English abstract) an electrical system incorporating servomotors to drive the trailer steering. The drawings are primarily directed to the electronic circuitry used in the system.

German Patent No. 4,216,543, published on Dec. 3, 1992, describes (according to the drawings and English abstract) a rigid linkage of two or more struts or tow bars between the towing vehicle and trailer, which angularly lock the trailer relative to the towing vehicle and prevent articulation therebetween. The trailer wheels are not actively steered, but, rather, caster to follow the turns of the towing vehicle during both forward and reverse travel. The lateral hydraulic cylinder disclosed in the drawings is not a steering actuation link or element, but is a shimmy damper, as conventionally applied to castering wheel systems.

Finally, German Patent No. 10,236,335, published on Feb. 27, 2003, indicates (according to the English title and abstract) that the subject trailer has a steerable front axle. However, no such steering mechanism is apparent in the drawings of the two-axle trailer. It appears that the trailer actually has castering front wheels, with no positive steering system being apparent.

None of the above inventions and patents, taken either singly or in combination, is seen to describe the instant invention as claimed. Thus, a trailer steering mechanism solving the aforementioned problems is desired.

SUMMARY OF THE INVENTION

The trailer steering mechanism facilitates the backing of a trailer by steering the trailer wheels in the same direction as the towing vehicle during backing maneuvers. The system automatically locks the trailer wheels straight for forward travel. A pivotally mounted steering frame is provided beneath the trailer frame, with the steering frame acting upon the tie rod(s) of the steerable wheels of the trailer. The steering frame receives its input from one or more hydraulic cylinders extending between the steering frame and a hitch bar, with the hitch bar being rigidly and immovably secured to the towing vehicle. The hydraulic cylinder(s) is/are hydrostatically locked during backing maneuvers, thus causing the steering frame of the trailer to pivot according to articulation between the trailer and towing vehicle when backing. The trailer follows (or more accurately leads, during backing maneuvers) the path of the towing vehicle during such backing maneuvers.

The locking of the hydraulic cylinder(s) or strut(s) is controlled by one or more valves, which control hydraulic flow between the two ends of the double acting cylinder(s). The valves are, in turn, controlled by an electric motor or other electric drive, which is, in turn, controlled by the conventional electrical back-up signal (backing lights, alarm bell or signal, etc.) provided for most motor vehicles. When no signal or electrical power is provided for backing, the valve(s) is/are open to allow relatively free hydraulic flow through the cylinder(s) or strut(s). This allows the cylinder(s) to extend and retract with articulation between the trailer and towing vehicle, while the steering frame of the trailer remains locked straight ahead to lock the wheels of the trailer. When the tow vehicle is placed in reverse, electrical power is received from the backing circuit of the tow vehicle to close the valve(s), thereby locking the hydraulic cylinder(s) to cause the trailer steering frame to move with the tow vehicle, thereby steering the trailer wheels.

The trailer steering mechanism may make use of various systems for actuating the hydraulic valve mechanism of the trailer, including multiple valves actuated by a single motor and chain or cable drive, or even a rigid rod linkage between the motor and valves, or a single valve having multiple ports, electrically operated solenoid valves, etc. Alternatively, the valve mechanism may be actuated by a self-contained electrical system on the trailer, or by manual operation if so desired. The hydraulic cylinder control valve(s) or hydraulic circuit may include one or more relief valves to relieve extreme pressures and forces in the system in the event of extreme steering angles by the tow vehicle during backing maneuvers. One or more steering frame and axle centering springs and adjustable steering stops may be provided to assist in centering the trailer steering and limit the steering angle of the trailer wheels. A mechanical latch may be provided to lock the trailer steering frame, and thus the trailer wheels, straight ahead for forward travel, with the latch automatically releasing for backing maneuvers and automatically engaging for forward travel. The mechanism may be applied to trailers having a forward and a rearward axle, i.e., farm wagons, with a link provided to a modified rear axle assembly permitting steering of the rear wheels in concert with the freely steering front wheels of the trailer.

An additional embodiment employs two hydraulic cylinders in tandem in a non-powered, purely hydraulic system. The only non-hydraulic operation of this alternative system is the actuation (e.g., electric, mechanical, manual, etc.) of the single control valve to open and close the hydraulic flow to and from the cylinders for forward or backing maneuvers. In this system the forwardly disposed steering cylinder extends from the hitch bar to the rearward cylinder and operates similarly to the actuation cylinders described further above, i.e., with the control valve being open during forward operation to allow cylinder extension and retraction, and closing (hydraulically locking) the cylinder during backing maneuvers. The rearward axle lock cylinder is a double-rod steering or hydraulic cylinder, modified to include bias springs coaxially disposed about the rods and valve passages through the piston, the passages being closed only when the trailer axle is straight so that the piston is center in the body of the cylinder.

While the term "trailer" has been used herein to describe the towed vehicle, machine, or device, it will be understood that the towed apparatus may comprise any form of towed implement, machine, or the like, e.g., wood chippers and other industrial machines having wheels for towing behind a motor vehicle, farm machinery, military equipment, etc., without limitation, so long as the trailer/towed implement incorporates one of the steering systems of the present invention. Moreover, it will be seen that a motor vehicle towing and backing a trailer using the present steering mechanism is not limited to towing and backing only a single trailer. Two or even more trailers may be towed and backed in tandem, so long as each of the trailers is equipped with a steering mechanism according to the present invention.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises various embodiments of a steering mechanism for trailers having steerable wheels, and various trailer configurations incorporating such a steering mechanism. The steering mechanism allows the steerable wheels of the trailer to be steered positively according to articulation between the towing vehicle and the trailer during backing maneuvers, while locking the steerable wheels straight ahead for forward travel of the trailer.

Figure 1:
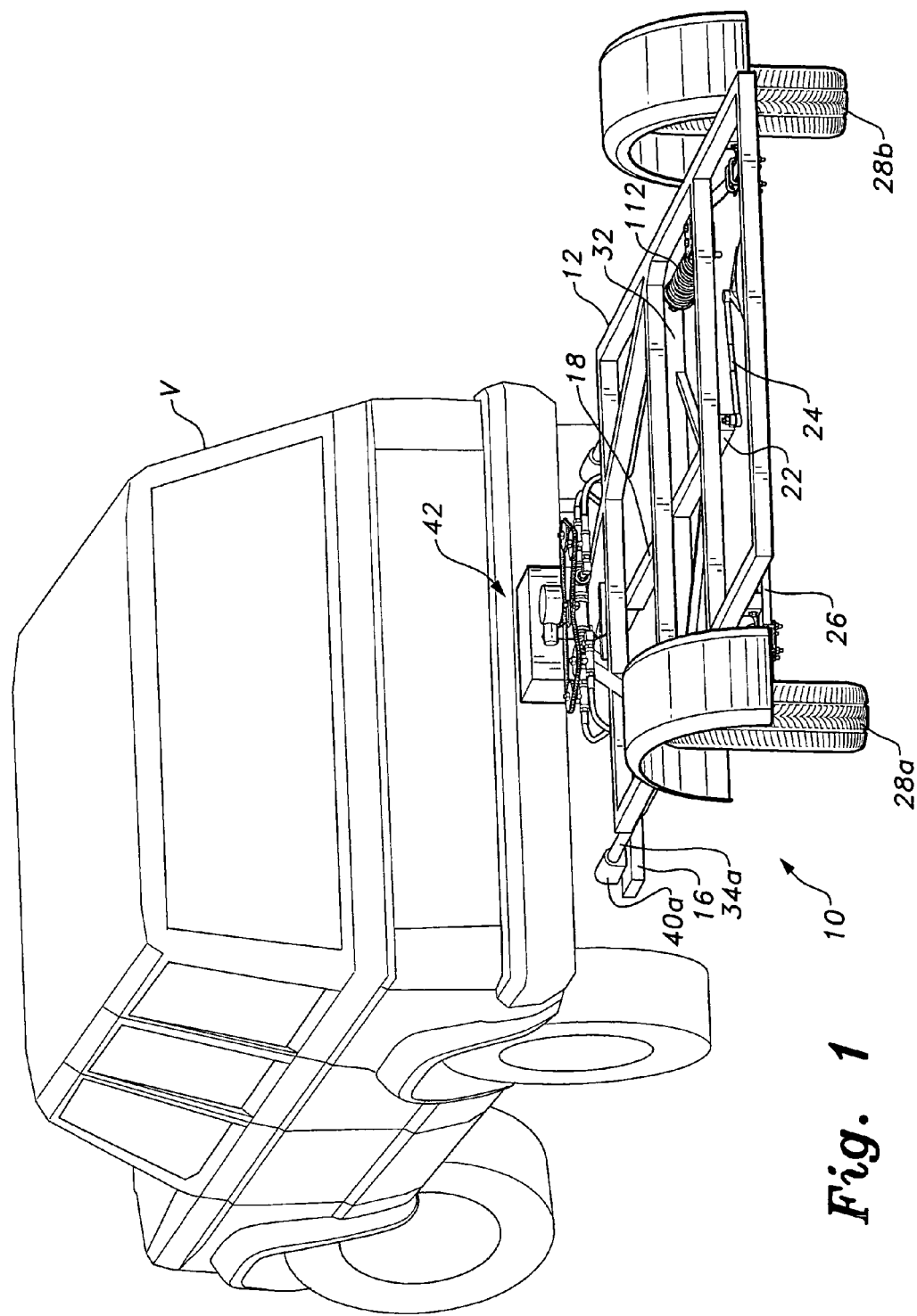
FIG. 1 is an environmental, perspective view of a towing vehicle with a trailer incorporating a trailer steering mechanism according to the present invention, showing its operation during a backing maneuver.
Figure 2:
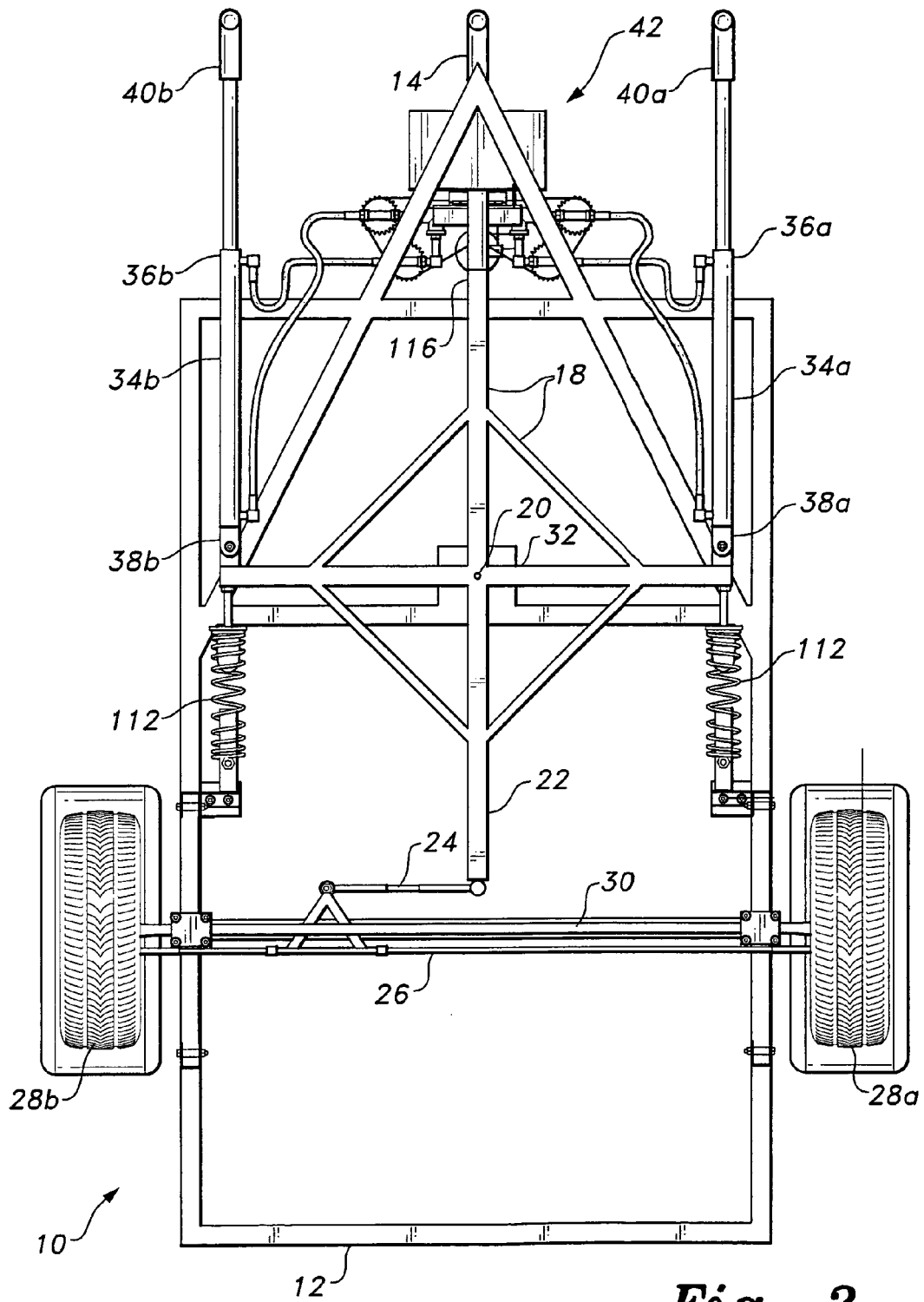
FIG. 2 is a bottom plan view of a trailer incorporating the trailer steering mechanism of the present invention, showing the general configuration thereof.

FIG. 1 of the drawings provides an environmental perspective view of a trailer 10 with its steering mechanism, shown hitched behind a towing vehicle V, with FIG. 2 providing a bottom plan view of the trailer 10 and its steering mechanism. The trailer 10 includes a frame 12 having a forwardly extending rigid tongue 14, with the tongue 14 being removably and pivotally hitched to a lateral three-ball hitch bar 16 attached to the tow vehicle V. The hitch bar 16 is shown most clearly in the top plan view illustrations of FIGS. 3, 4, and 5, and is rigidly and immovably secured to the tow vehicle V by means of a conventional receiver hitch or the like. The hitch bar 16 comprises a three-ball hitch bar, having a central ball for the removable connection of the trailer tongue 14 coupler thereto and opposite left and right balls for the removable connection of the couplers of the left and right hydraulic cylinders (described in detail further below) thereto.

The steerable trailer 10 includes a steering frame 18 attached beneath the trailer frame 12 at a pivot 20. The location of the pivot point 20 for the steering frame 18 may vary from that shown, so long as the geometry of the steering linkage (i.e., various arm lengths, arcuate and linear movements, etc.) is adjusted accordingly. In the example of FIG. 2, the steering frame 18 includes a rearwardly extending steering arm 22, which connects to an intermediate link 24 between the distal end of the arm 22 and the tie rod(s) 26 of the steerable trailer wheels 28a, 28b, which extend from each end of the axle 30 of the trailer 10. The wheels 28a, 28b are attached to the trailer axle 30 by conventional articulated joints, e.g., king pins, etc., to allow the trailer wheels 28a, 28b to be steered when the steering frame 18 pivots to move the tie rod(s) 26 by means of the intermediate link 24.

The steering frame 18 includes a crossmember 32 which provides for attachment of at least one hydraulic cylinder to the steering frame, with there preferably being one hydraulic strut or cylinder 34a installed to the left side of the trailer tongue 14 and a second strut or cylinder 34b installed to the right side of the tongue 14. Alternatively, plural struts or cylinders may be installed to each side of the central tongue 14, if so desired, depending upon the rating of each hydraulic cylinder or strut and the size of the trailer and maneuvering forces required. Each of the cylinders 34a, 34b has a hitch coupling end 36a and 36b and an opposite steering frame attachment end 38a and 38b, with the forward coupling ends 40a, 40b of the cylinders being pivotally coupled to, and extending from, the corresponding ends of the hitch bar 16, and the steering frame attachment ends 38a, 38b attaching to the ends of the steering frame crossmember 32. The struts or cylinders 34a, 34b are parallel to the trailer tongue 14 and to one another, with the tongue 14 centered between the two struts or cylinders.

The trailer steering mechanism is selectively actuated according to forward or reverse travel of the tow vehicle V and trailer 10, with the steering mechanism being locked in a neutral position with the trailer wheels 28a, 28b straight ahead regardless of articulation between the towing vehicle V and trailer 10 during forward motion, and with the hydraulic cylinders 34a, 34b being hydraulically locked to transmit articulation between the hitch bar 16 of the tow vehicle V and the steering frame 18 of the trailer 10 to steer the trailer wheels 28a, 28b during backing maneuvers. This is controlled by a hydraulic strut or cylinder control mechanism 42, shown in detail in FIG. 6 of the drawings.

In the mechanism 42 embodiment of FIGS. 1 through 4 and FIG. 6, a series of four hydraulic control valves 44 through 50 are controlled by a single valve actuator 52. The first control valve 44 is positioned between a source of hydraulic fluid or reservoir 54 and the hitch bar attachment end 36a of the first or left side hydraulic cylinder or strut 34a. The second control valve 46 is positioned between the hydraulic reservoir 54 and the steering frame attachment end 38a of the first or left side cylinder or strut 34a. The third control valve 48 is positioned between the hydraulic reservoir 54 and the hitch bar attachment end 36b of the second or right side hydraulic cylinder or strut 34b, with the fourth control valve 50 being positioned between the hydraulic reservoir 54 and the steering frame attachment end 38b of the second or right side cylinder or strut 34b.

The four valves 44 through 50 are linked to the actuator 52 by a roller chain 56, which is driven by a drive sprocket 58 extending from the actuator, with the drive sprocket 58, in turn, driving a valve sprocket 60 extending from each of the valves. When the actuator 52 is rotated, its sprocket 58 drives the chain 56 to rotate each of the driven sprockets 60 of the four valves, thereby turning the valves on or off according to the operation of the actuator. It will be seen that other mechanisms may be used in lieu of the above-described mechanism, e.g., a cable drive, a series of rigid pushrods between the valves, etc., or even manual actuation, as desired. Alternatively, electric solenoid valves may be used in lieu of mechanically or manually actuated valves, if so desired.

The actuator 52 is driven by an electric motor 62, which is controlled by a solenoid switch 64, with the solenoid 64 receiving power from the conventional backup signal 66 (backup lights, bells, etc.) provided on tow vehicles. A separate manually-controllable cutout switch 68 may be included in the circuit, if so desired, in order that the trailer wheels may be locked straight during backing maneuvers, e.g., when maneuvering in tight quarters. Assuming the cutout switch 68 is closed, shifting the tow vehicle into reverse provides electrical power to the solenoid switch 64 to actuate the valve actuator control motor 62. This rotates the actuator 52, thereby driving the chain 56 to rotate each of the valve sprockets 60 to close their corresponding valves 44 through 50 to hydraulically lock the lengths of the two cylinders 34a and 34b. This results in articulation between the tow vehicle V and trailer 10 turning the steering frame 18 of the trailer, thereby turning the trailer wheels 28a and 28b, as described further above. This is the preferred means of carrying out the control of the system, i.e. providing electrical power from the tow vehicle. However, electrical valve actuation may be accomplished by electrical power supplied by a source on the trailer, if so desired.

Figure 10:
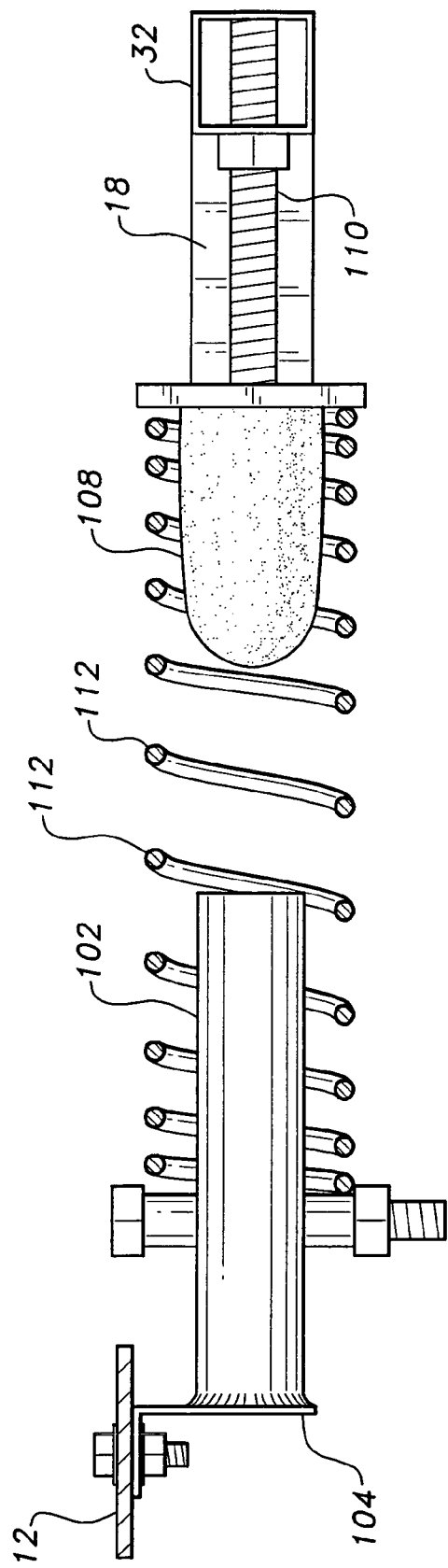
FIG. 10 is a detailed side elevation view in partial section of one of the steering centering and limit devices of a trailer steering mechanism according to the present invention.

Shifting of the tow vehicle to a forward gear (or opening the cutout switch 68) shuts off the electrical signal to the solenoid 64, thereby shutting off power to the actuator motor 62. This allows the actuator 52 to return to its original position, driving the chain 56 and valve sprockets 60 to open the various hydraulic cylinder or strut control valves 44 through 50. Alternatively, a separate circuit may be provided to drive the motor 62 in the opposite direction to open the valves for forward travel. This allows hydraulic fluid to flow relatively freely through the system, with the two hydraulic cylinders 34a and 34b extending and retracting with articulation between the tow vehicle V and trailer 10 as the assembly turns during forward motion. The viscosity of the hydraulic fluid flowing through the system during turning maneuvers does provide some beneficial damping of any unwanted sway between the trailer and tow vehicle. Since the hydraulic cylinders are no longer hydraulically locked, they do not impart any significant thrust or force upon the steering frame 18 to steer the wheels of the trailer. However, a positive mechanical lock may be provided for the steering frame 18 to assure that the trailer wheels are locked straight ahead during forward travel for stability of the trailer and tow vehicle assembly. This locking mechanism is illustrated in FIG. 10, and discussed further below.

It will be seen that there is no hydraulic pump installed in this hydraulic system, as none is required. The hydraulic system of the present mechanism merely serves to selectively lock the lengths of the hydraulic cylinders or struts 34a and 34b to lock the relative orientation of the steering frame 18 relative to the hitch bar 16 of the tow vehicle V when backing, thus causing the locked hydraulic cylinders to steer the steering frame to turn the trailer wheels. Conversely, free flow of hydraulic fluid is permitted back and forth between the cylinders 34a and 36a when in forward travel, thus allowing articulation between the trailer 10 and tow vehicle V while the steering frame 18 is locked to lock the trailer wheels straight ahead. While no hydraulic pump is required, the closed and sealed system may be pneumatically pressurized, if so desired, by adding some predetermined air (or other gas) pressure to the reservoir 54 to serve as a preload for the system. The provision of a closed, sealed system provides additional benefits as well in preventing contaminants (e.g., road dirt and debris, moisture, etc.) from entering the system, thus adding to the longevity of the hydraulic fluid in the system as well as to the components of the system.

Figure 6:
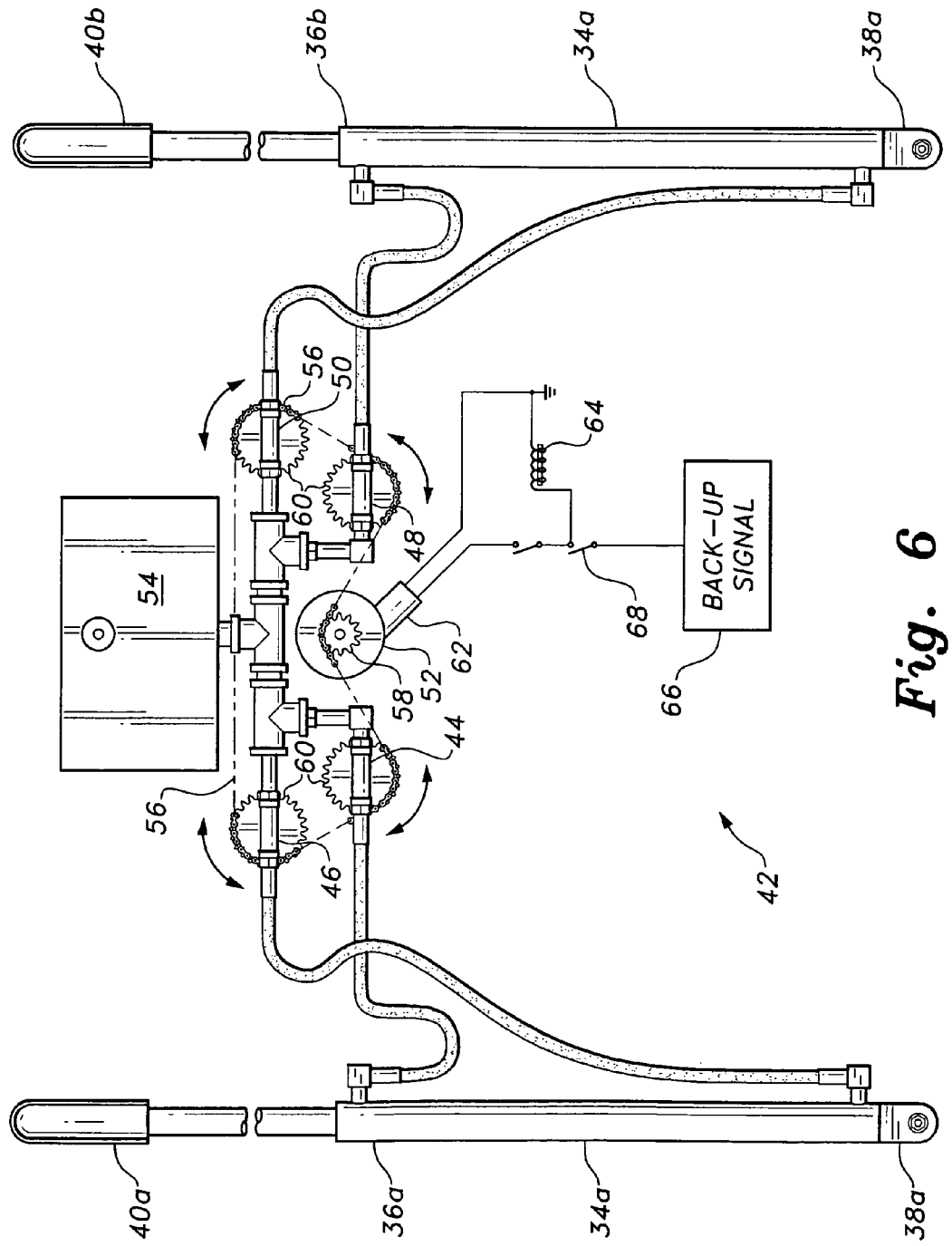
FIG. 6 is a detailed top plan view showing a first embodiment of an actuating mechanism for the hydraulic valves of a trailer steering mechanism according to the present invention.
Figure 7:
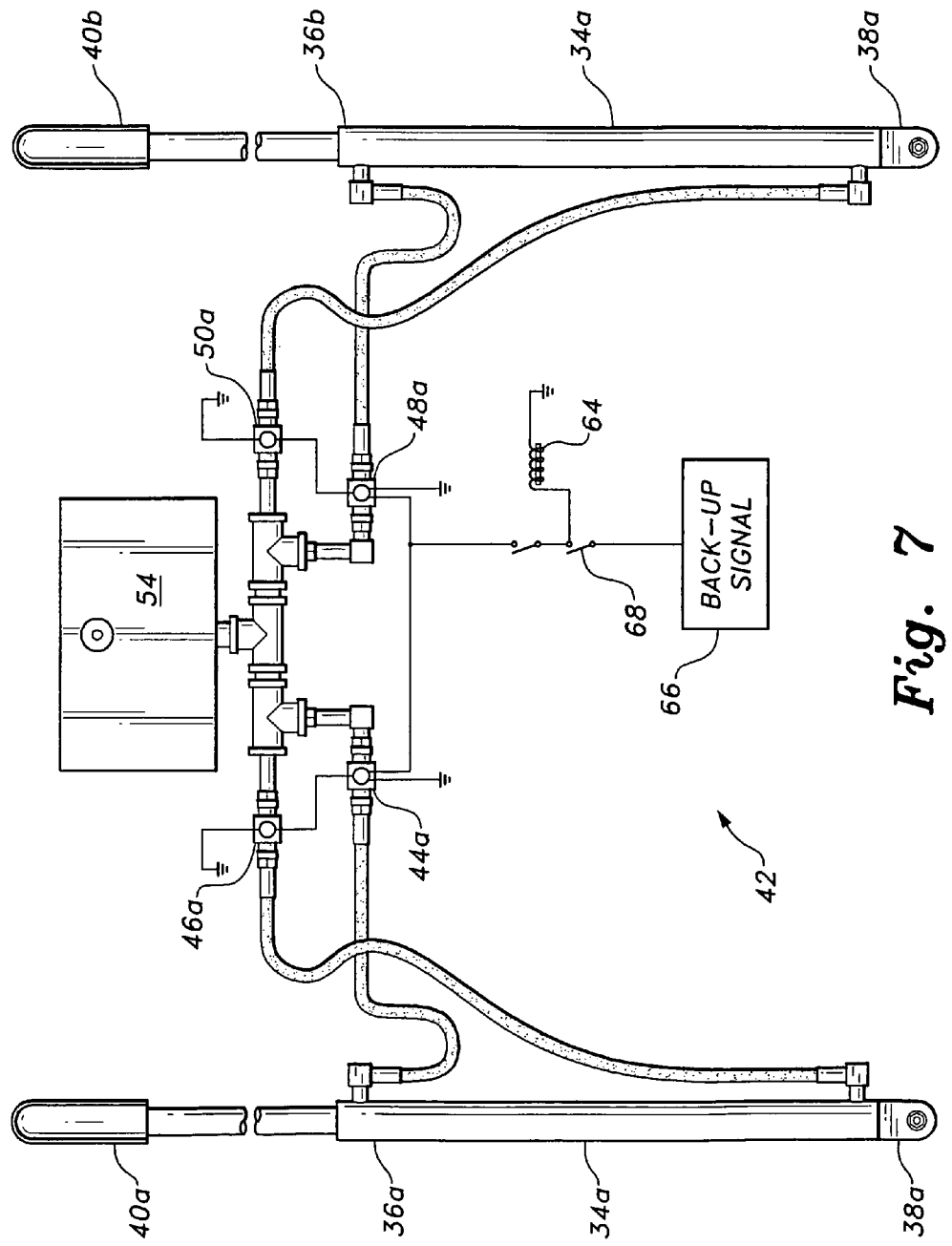
FIG. 7 is a detailed top plan view showing another embodiment of an actuating mechanism for the hydraulic valves of a trailer steering mechanism according to the present invention, wherein the system incorporates electrically actuated solenoid valves to control hydraulic flow.

FIG. 7 provides a top plan view in which the above-described hydraulic system (illustrated in FIG. 6) is controlled by electrohydraulic solenoid valves 44a through 50a. The electrohydraulic solenoid valves 44a, 46a, 48a, and 50a each include a hydraulic valve selectively permitting or stopping the flow of hydraulic fluid therethrough, with the hydraulic valve being controlled by the mechanical action of an electrically actuated solenoid. Accordingly, the mechanical system shown in FIG. 6 is not needed for control of the electrically actuated valves 44a-50a of the embodiment of FIG. 7. Electrical power to the electrohydraulic solenoid valves 44a through 50a may be controlled through an electrical circuit identical to that used for the control and operation of the electric motor 62 driving the valve actuator 52 for the mechanical system of FIG. 6, i.e., a solenoid 64 receiving power from the back-up system 66 of the tow vehicle. A separate conventional electrical power source may be provided from the tow vehicle or an electrical source on the trailer (e.g., battery, etc.) if more electrical power is required than can be provided through the back-up system 66, with the actuation of the separate power source being controlled by another solenoid similar to the solenoid 64 shown in FIGS. 6 and 7, or a double pole solenoid or the like.

Figure 8:
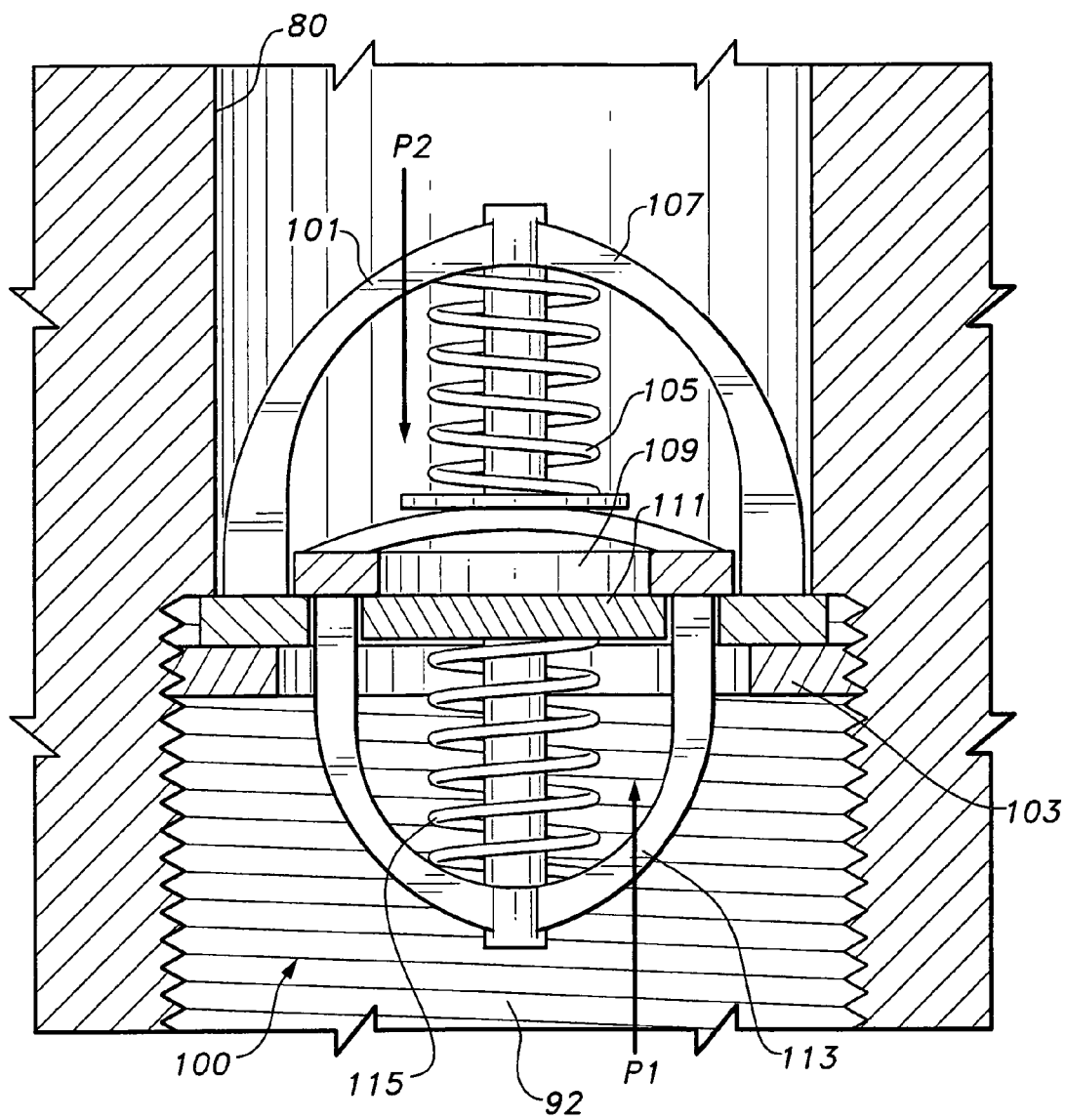
FIG. 8 is a plan view in section of an exemplary two-way or double-acting pressure relief valve for use in the trailer steering mechanism of the present invention.

FIG. 8 of the drawings provides a side elevation view in section of an exemplary double-acting or two-way pressure relief valve 100, which may be incorporated in the trailer steering mechanism. This two-way valve 100 serves to relieve excessive hydraulic pressure in the system in either direction of flow through the valve. The valve 100 includes a stationary frame 101, which is secured within a passage through the valve housing or body, e.g., the passage 92 of the rotary valve member 80 of FIG. 9, by a retaining ring 103 or the like. A first valve spring 105 extends between the stationary frame 101 and a first or outer poppet valve 107, with the first valve 107 opening toward the first spring 105 when sufficient pressure is developed to overcome spring pressure.

The first or outer valve 107 includes a central opening or passage 109 therethrough, which is sealed by a second poppet valve 111. The second valve 111 is held in position over the first valve opening 109 by a second frame 113, which extends from the first valve 107 opposite the first or stationary frame 101, with a second valve spring 115 being captured between the second frame 113 and second valve 111 to urge the second valve 111 against the inner face of the first valve 107. Thus, a first pressure P1 of sufficient force to compress the first valve spring 105 will force the second valve 111 against its seat on the first valve 107, but will push the first valve 107 open from its seat on its stationary frame 101 to relieve the excessive pressure P1. However, an opposite second pressure P2 acts in the same direction as the force developed by the first valve spring 105, with the first valve 107 accordingly remaining closed. But such a pressure P2 acts against the face of the second valve 111 and against its spring 115, pushing the second valve 111 open to relieve excessive pressure in the direction indicated by P2 in FIG. 8.

It will thus be seen that the pressure relief valve 100 can relieve excessive hydraulic pressure in either direction using only a single valve. Moreover, the two springs 105, 115 may be provided with adjustable compressive force by means of threaded retainers between the respective valve frames and valves in order to allow the opening force for each valve 107, 111 to be adjusted as desired. It will be seen that such a two-way or double-acting pressure relief valve(s) 100 may be incorporated in the hydraulic circuits of FIGS. 6 and/or 7, wherein four separate control valves are used, with each incorporating a single two-way pressure relief valve 100. Alternatively, single directional relief valves may be incorporated by means of two separate parallel hydraulic paths between each control valve or port and corresponding hydraulic cylinder or strut end.

Figure 9:
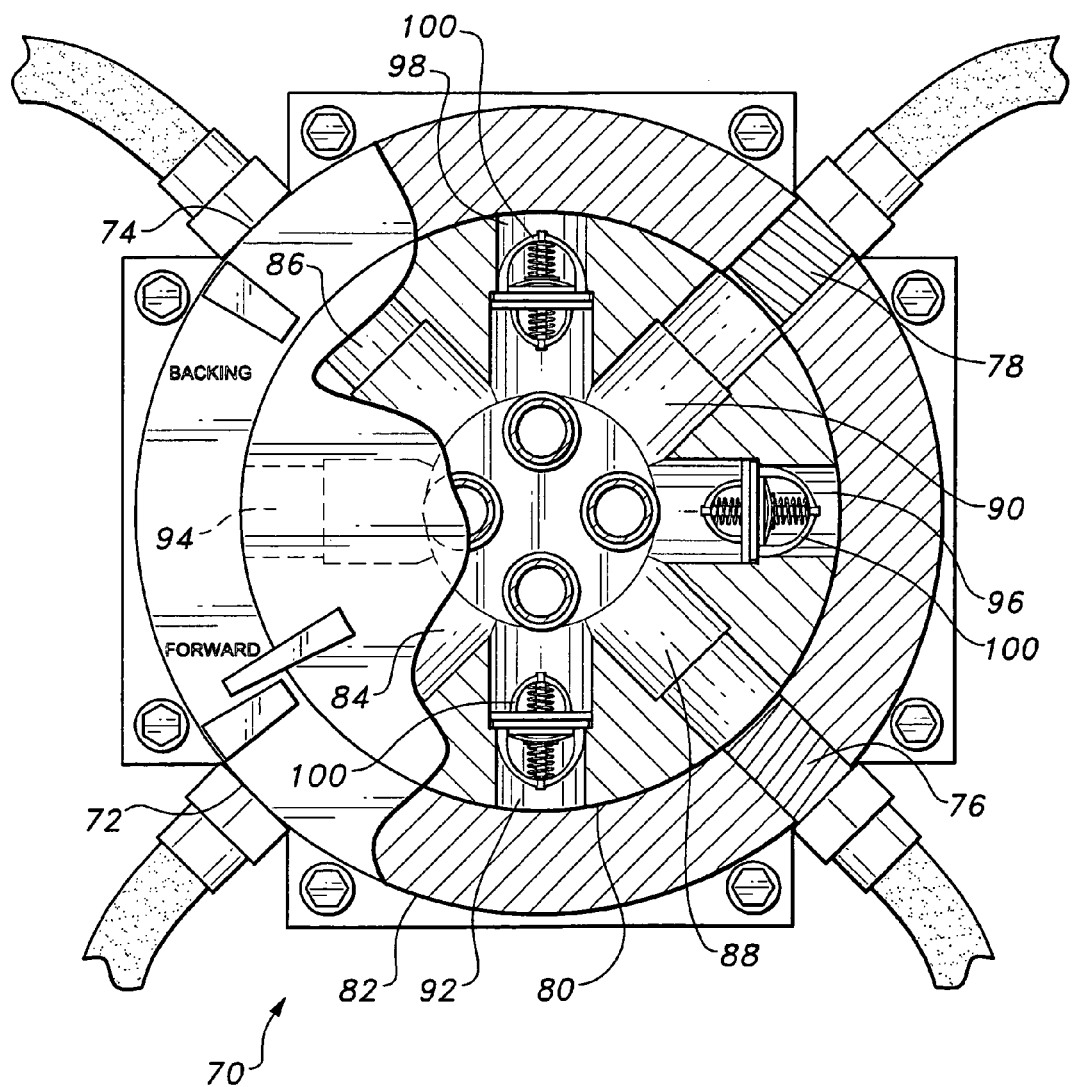
FIG. 9 is a detailed top plan view of an alternative embodiment of a valve mechanism for a trailer steering mechanism according to the present invention, incorporating the entire valve mechanism in a single housing.

FIG. 9 of the drawings illustrates an alternative valve assembly 70, which may be incorporated in the trailer steering mechanism in lieu of the four separate valves and actuator illustrated in detail in FIGS. 6 and 7 and described above. The valve assembly 70 of FIG. 9 incorporates four separate valve ports or outlets, respectively 72 through 78, which communicate hydraulically with the respective hitch coupling end 36a and steering frame arm attachment end 38a of the first or left hydraulic cylinder or strut 34a and the hitch coupling end 36b and steering frame arm attachment end 38b of the second or right hydraulic cylinder or strut 34b. A single rotary member 80 rotates within the valve body 82 to selectively align the four hydraulic passages 84 through 90 of the rotary member 80 with the four outlet ports 72 through 78 of the valve assembly 70 to allow flow between the ends of the hydraulic cylinders 34a and 34b so that the trailer wheels 28a, 28b may be locked straight ahead for forward travel of the trailer 10. The valve assembly 70 is illustrated in this open flow configuration for forward travel in FIG. 9.

When the trailer 10 is to be backed, the rotary center member 80 of the valve assembly 70 is rotated (manually, or by means of an actuator motor and electrical circuit, such as the motor 62 and circuit shown in FIG. 6 and described further above) through forty-five degrees to align the passages 84 through 90 of the rotary member 80 with the closed interior sidewalls of the valve body 82, thereby shutting off flow between those passages 84 through 90 and their respective hydraulic cylinders 34a and 34b to lock the cylinders hydraulically.

However, it will be noted that the valve assembly 70 includes additional restricted flow passages 92 through 98, each of which includes a two-way pressure relief valve 100 therein; such a two-way pressure relief valve 100 is shown in detail in FIG. 8 of the drawings, and has been described in detail above. When the valve 70 has been repositioned to close the primary passages 84 through 90 for backing operations, the pressure relief or restricted flow passages 92 through 98 are aligned with the four ports 72 through 78. So long as hydraulic pressure remains below a certain predetermined level(s) within the cylinders 34a, 34b and their hydraulic lines, the relief valves 100 remain closed.

However, in the event that, e.g., an excessive turning angle is reached that might cause damage to the mechanical steering mechanism, the relief valve(s) 100 will open briefly to relieve hydraulic pressure in the system, and then reset automatically once the pressure has been relieved. This limits the extension and/or retraction of the hydraulic cylinders or struts 34a, 34b, rather than having the locked cylinders exert excessive force upon the mechanical structure of the trailer 10 and its steering mechanism and possibly overstressing and/or damaging the structure.

FIG. 10 of the drawings provides a detailed side elevation view in partial section of an exemplary steering centering spring and stop limit assembly, which may be incorporated into the trailer steering mechanism. The assembly of FIG. 10 installs between the trailer frame 12 and the pivotal steering frame 18, or more precisely one (or both) of the lateral arms or crossmembers 32 of the steering frame. A steering angle limit stop 102 is secured (e.g., welded, etc.) to a bracket 104, which extends from the trailer frame 12. A steering stop bumper 108 is adjustably secured to the steering frame arm 32 by a threaded adjuster 110. The span between the end of the limit stop 102 and the end of the bumper 108 may be adjusted by means of the adjuster 110 to adjust the maximum angle or limit of the steering geometry of the trailer 10. A steering centering coil spring 112 is installed concentrically over and between the steering limit stop 102 and bumper 108 to urge the wheels to a straight position when the hydraulics are released during forward movement, and to limit the impact forces between the steering limit stop 102 and bumper 108 during extreme turning maneuvers when backing.

The above-described trailer steering centering mechanism serves to resist angular steering input at and near the predetermined geometric steering limits for the trailer, but the spring force does relatively little to resist steering input from the neutral or straight ahead position of the trailer wheels, particularly when identical centering mechanisms are installed upon each crossmember 32 of the steering frame 18. The lack of any means for holding the trailer wheels precisely aligned would result in instability and trailer wandering during forward travel. Accordingly, a steering lock mechanism is provided for the trailer steering, as shown in the left side elevation view of FIG. 11.

Figure 11:
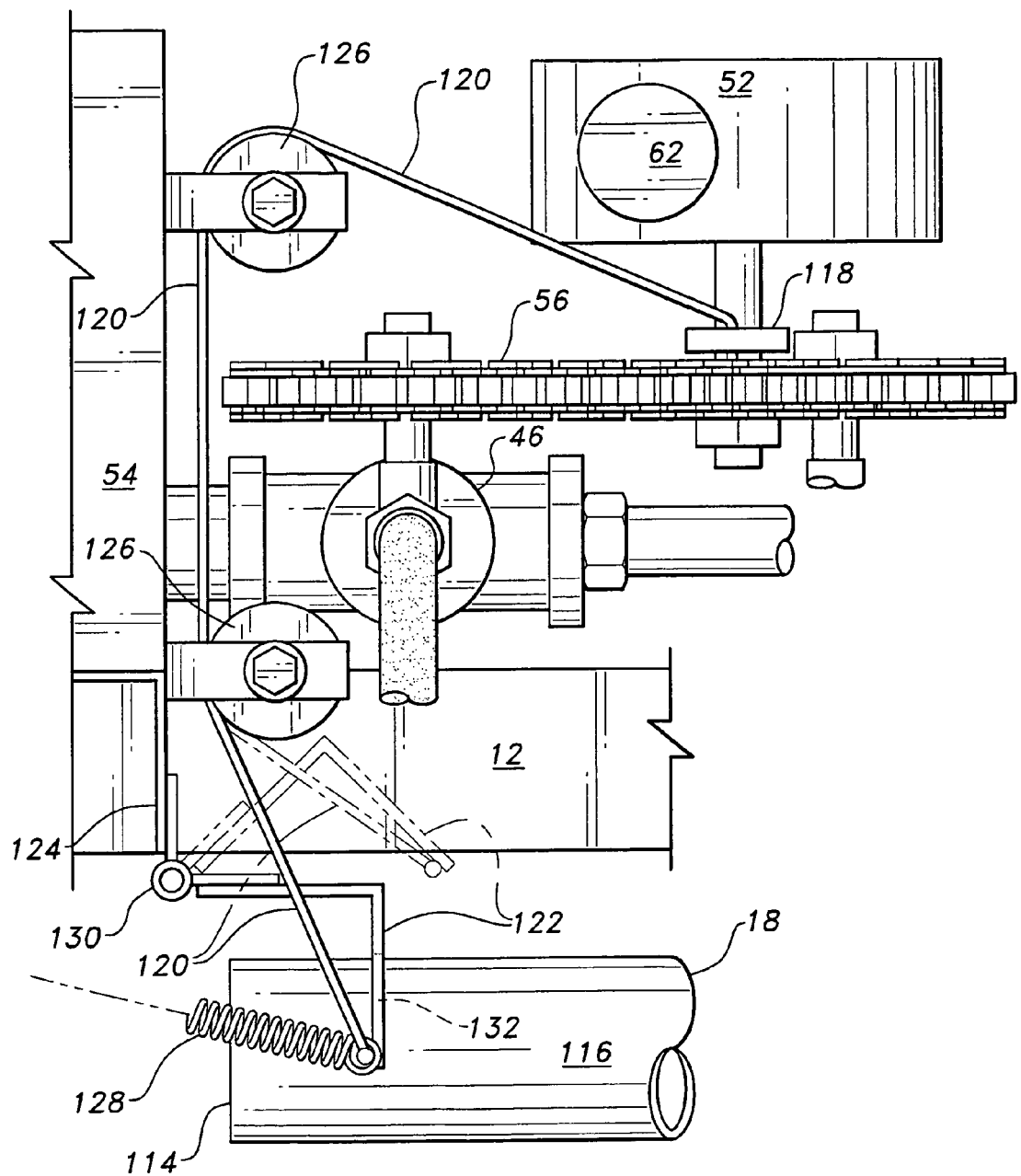
FIG. 11 is a left side elevation view of the locking mechanism for securing the trailer wheels in a straight ahead position for forward travel in a trailer steering mechanism according to the present invention.

FIG. 11 illustrates the distal forward end 114 of the forwardly extending arm 116 of the trailer steering frame 18, disposed generally beneath the hydraulic valve actuator 52 and its motor 62 and other componentry. The valve actuator 52 includes an actuator shaft and arm assembly 118 extending therefrom, with the actuator shaft serving to rotate the hydraulic valve drive sprocket 58 (shown in FIG. 6). A steering frame lock cable 120 (or chain or other flexible member, etc.) extends in tension from the arm of the actuator shaft and arm assembly 118, ultimately connecting to a steering frame arm lock 122, which is pivotally attached laterally to the trailer frame 12, or more precisely to a crossmember 124 extending between the two lateral members of the frame 12. The cable 120 may pass over or through one or more pulleys 126 or guides, fairleads, etc. in order to achieve the proper routing and direction of operation. A down spring 128 urges the steering frame arm lock 122 down to its engaged position to capture the forward end portion 114 of the forwardly extending steering frame arm 116. The steering frame arm lock 122 may comprise a laterally disposed length of material having a generally L-shaped cross section, e.g., "angle iron" or the like. The side or face opposite its attachment hinge 130 includes a steering arm engagement slot 132 therein (shown in broken lines in FIG. 11), which fits fairly precisely over the forward arm portion 116 of the steering frame.

When the actuator 52 is operated to close the hydraulic control valves 44 through 50 (shown in FIG. 6; a conventional solenoid may be used to reposition a lever or arm, for the solenoid valve system of FIG. 7), or alternatively, the single valve 70 (shown in FIG. 9) to allow the trailer wheels to be steered for backing maneuvers, the actuator shaft and arm 118 rotate to the right, as shown in the side view of FIG. 11, pulling the upper portion of the cable 120 to the right and the lower end of the cable upwardly, thereby drawing the steering arm lock 122 upwardly generally to its position as shown in broken lines in FIG. 11. This allows the forward end portion 114 of the steering frame arm 116 to swing laterally in accordance with steering input due to the articulation between the towing vehicle V and trailer 10, to the limits defined by the steering centering and stop mechanism of FIG. 10 and/or any other mechanical limits.

However, when the towing vehicle is placed in a neutral or forward gear, i.e., the backup signal is no longer activated, the valve actuator 52 rotates the actuator shaft and arm assembly 118 to the position shown in FIG. 11, thereby allowing the down spring 128 to draw the cable 120 and steering arm lock 122 downwardly against the top of the steering frame arm 116. The lower edge of the steering arm lock 122 will ride against the upper surface of the steering frame arm 116 if the arm is not centered. However, when the trailer 10 is pulled forward slightly, the wheel centering spring(s) 112 cause the steerable wheels 28a, 28b of the trailer 10 to move to a straight ahead position, thus forcing the arm 116 to center. This allows the engagement slot 132 of the steering arm lock 122 to drop downwardly over the steering frame arm 116, thus capturing the arm 116 within the slot 132 of the steering arm lock 122 to lock the arm 116 and its steering frame 18 and trailer wheels 28a, 28b straight for stable towing of the trailer 10 during forward travel. The engagement of the steering arm lock 122 with the steering frame arm 116 is easily detected by the driver of the tow vehicle, as the lock 122 is pulled sharply down over the steering arm 116 when the arm centers. Alternatively, a solenoid actuator may be used to control the steering arm lock 122. The solenoid actuator would be controlled by the same electrical circuit as used to control a solenoid valve system, e.g., the system of FIG. 7 of the drawings.

The above-described trailer towing mechanism and trailer with its steerable wheels is directed to a trailer having a single axle with two steerable wheels, one on each end of the single axle. However, the trailer steering mechanism may also be applied to trailers having multiple axles, such as the farm wagon type trailer 10a of FIG. 5. The trailer 10a of FIG. 5 has a frame 12a (shown as a solid peripheral edge for the trailer 10a in FIG. 5) carrying a forward axle 30a and a rearward axle 30b, with the forward axle 30a having free steering left and right wheels 28c, 28d at the opposite ends thereof and the rearward axle 30b having directionally steerable wheels 28e, 28f at the opposite ends thereof. The front wheels 28c, 28d are free steering in the sense that they are directionally articulating, but do not include a steering control mechanism. A tie rod 26a extends between the steering mechanism of each steerable rear wheel 28e, 28f, with the tie rod 26a being connected to the steering frame 18a by an intermediate steering link 24a.

Figure 3:
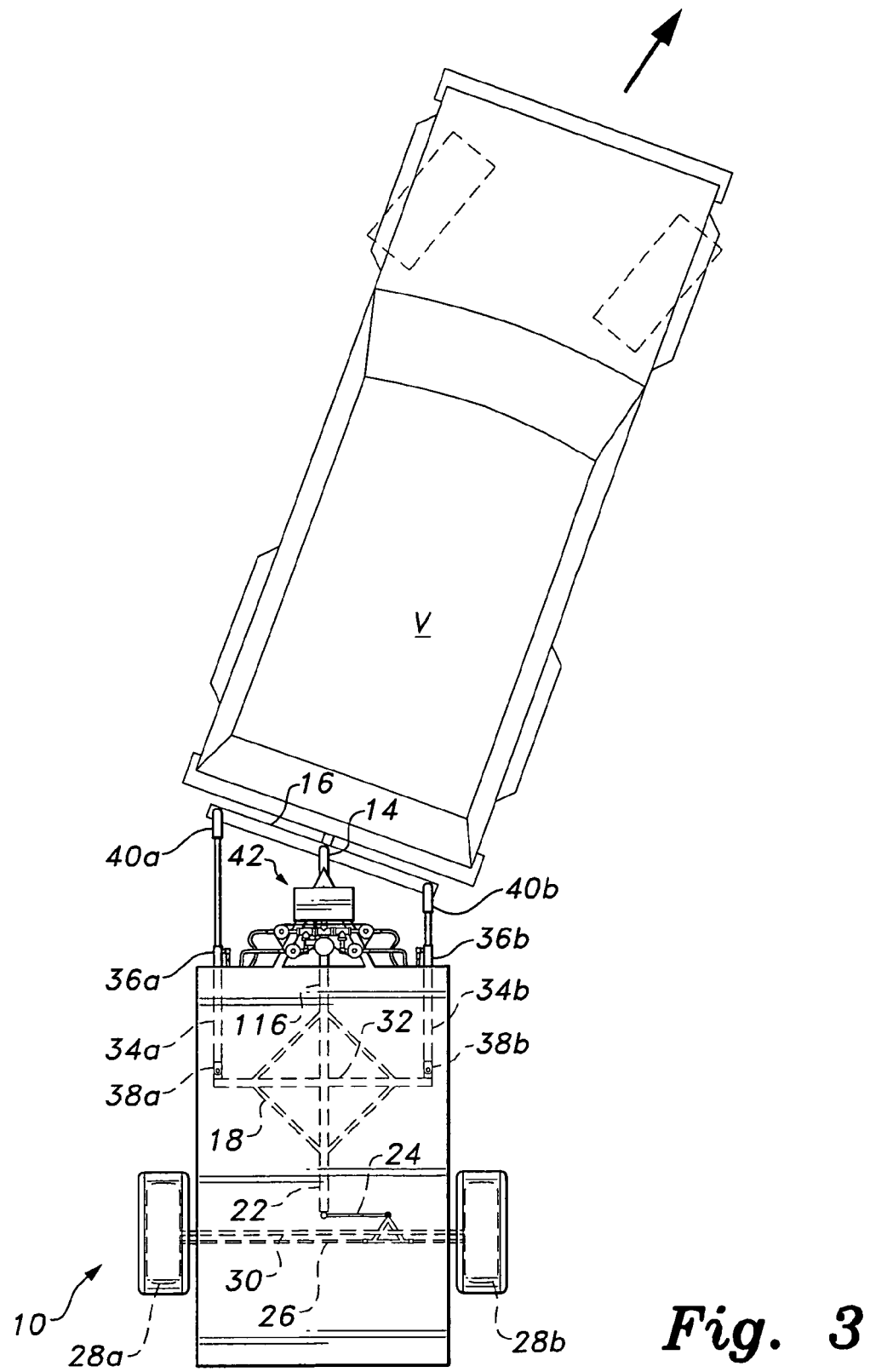
FIG. 3 is a schematic top plan view showing a towing vehicle and trailer steering mechanism according to the present invention during forward travel, with the trailer wheels being locked straight for forward travel.
Figure 4:
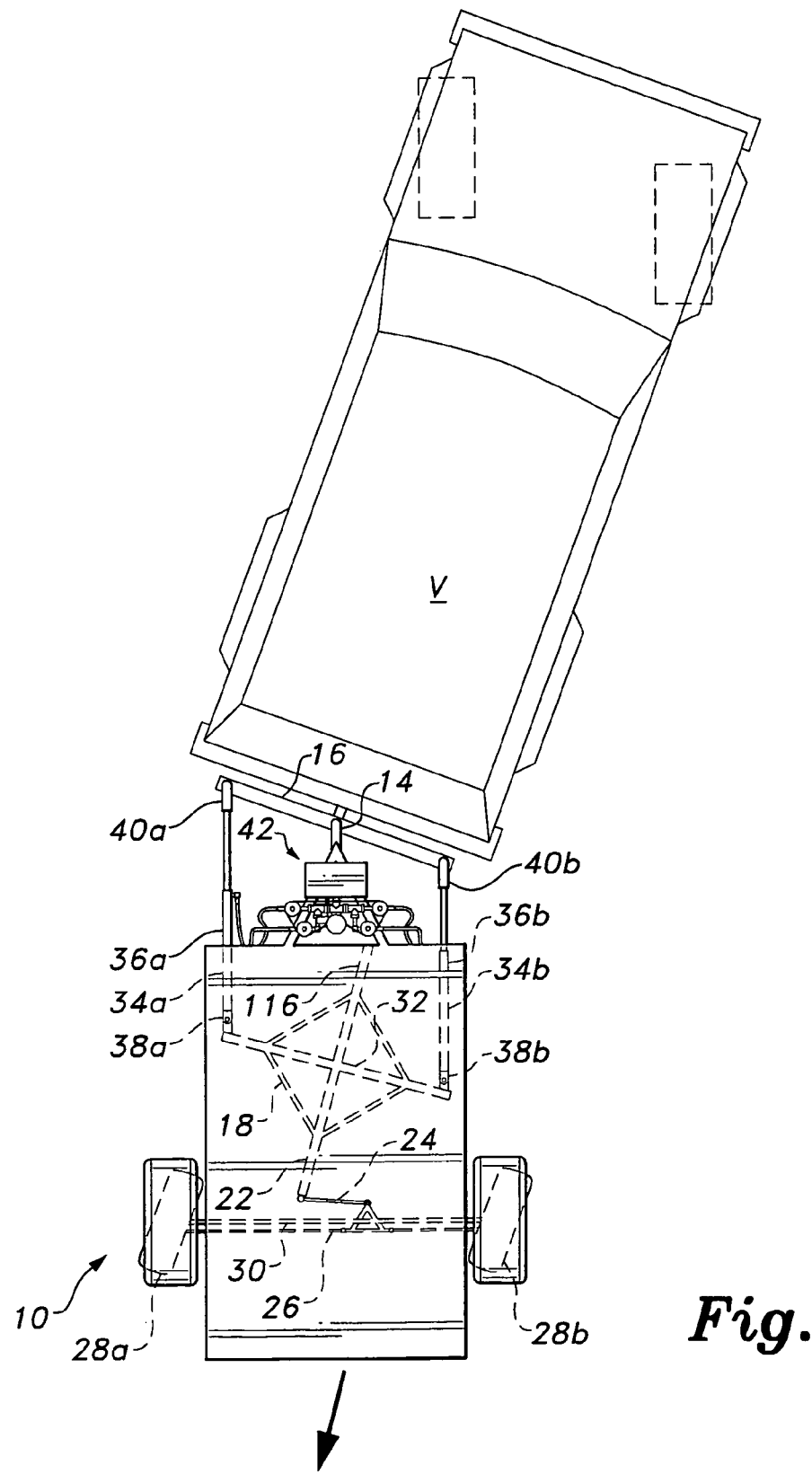
FIG. 4 is a schematic top plan view showing a towing vehicle and trailer steering mechanism according to the present invention during a backing maneuver, with the trailer wheels automatically turning to align the trailer with the path of the towing vehicle.

The steering mechanism for the trailer 10a with its rearward axle 30b and its directionally steerable rear wheels 28e, 28f is generally the same steerable wheel mechanism as described further above for the trailer 10 with its single axle 30 and steerable wheels 28a, 28b, shown in FIGS. 2 through 4 of the drawings. However, the pivotally mounted steering frame 18a includes a rearward steering arm extension 22a to which the intermediate steering link 24a is attached, with the distal end of the link 24a being attached to the rear axle tie rod 26a. Thus, only the rear wheels 28e, 28f extending from the rear axle 30b of the trailer 10a may be steered, with the front wheels 28c, 28d being free steering, i.e. not connected to or directionally controlled by a steering mechanism.

The rear axle steering mechanism of the rear wheel steering trailer 10 is controlled by means of the same apparatus as provided with the trailer 10. The frame 12a of the trailer 10a includes a forwardly extending rigid tongue 14, with the tongue 14 being removably and pivotally hitched to a lateral hitch bar 16 rigidly attached to the tow vehicle V. The steering frame 18a includes a crossmember 32a which provides for attachment of at least one hydraulic cylinder to the steering frame, with there preferably being one hydraulic strut or cylinder 34a installed to the left side of the trailer tongue 14 and a second strut or cylinder 34b installed to the right side of the tongue 14. Alternatively, plural struts or cylinders may be installed to each side of the central tongue 14, if so desired, particularly in the case of a relatively large and heavy multiple axle farm wagon-type trailer 10a. Each of the cylinders 34a, 34b has a hitch coupling end 36a and 36b and an opposite steering frame attachment end 38a and 38b, with the forward ends 40a, 40b of the cylinder struts being pivotally coupled to, and extending from, the corresponding ends of the hitch bar 16, and the steering frame attachment ends 38a, 38b attaching to the ends of the steering frame crossmember 32a. The struts or cylinders 34a, 34b are parallel to the trailer tongue 14 and to one another, with the tongue 14 being centered between the two struts or cylinders, just as in the case of the single axle trailer 10 embodiment.

The above-described steering mechanism is controlled by a hydraulic cylinder or strut control system 42, as illustrated in FIGS. 6 and 7 of the drawings and described in detail further above. Alternatively, the multiple valve mechanism of the system 42 may be replaced by the single valve mechanism 70 of FIG. 9, if so desired. The system operates in essentially the same manner as described above for the single-axle trailer 10, but steers only the wheels and tires 28e and 28f of the rear axle 30b, with the forward wheels and tires 28c, 28d of the front axle 30a being able to free steer at all times during forward or rearward travel.

Figure 5:
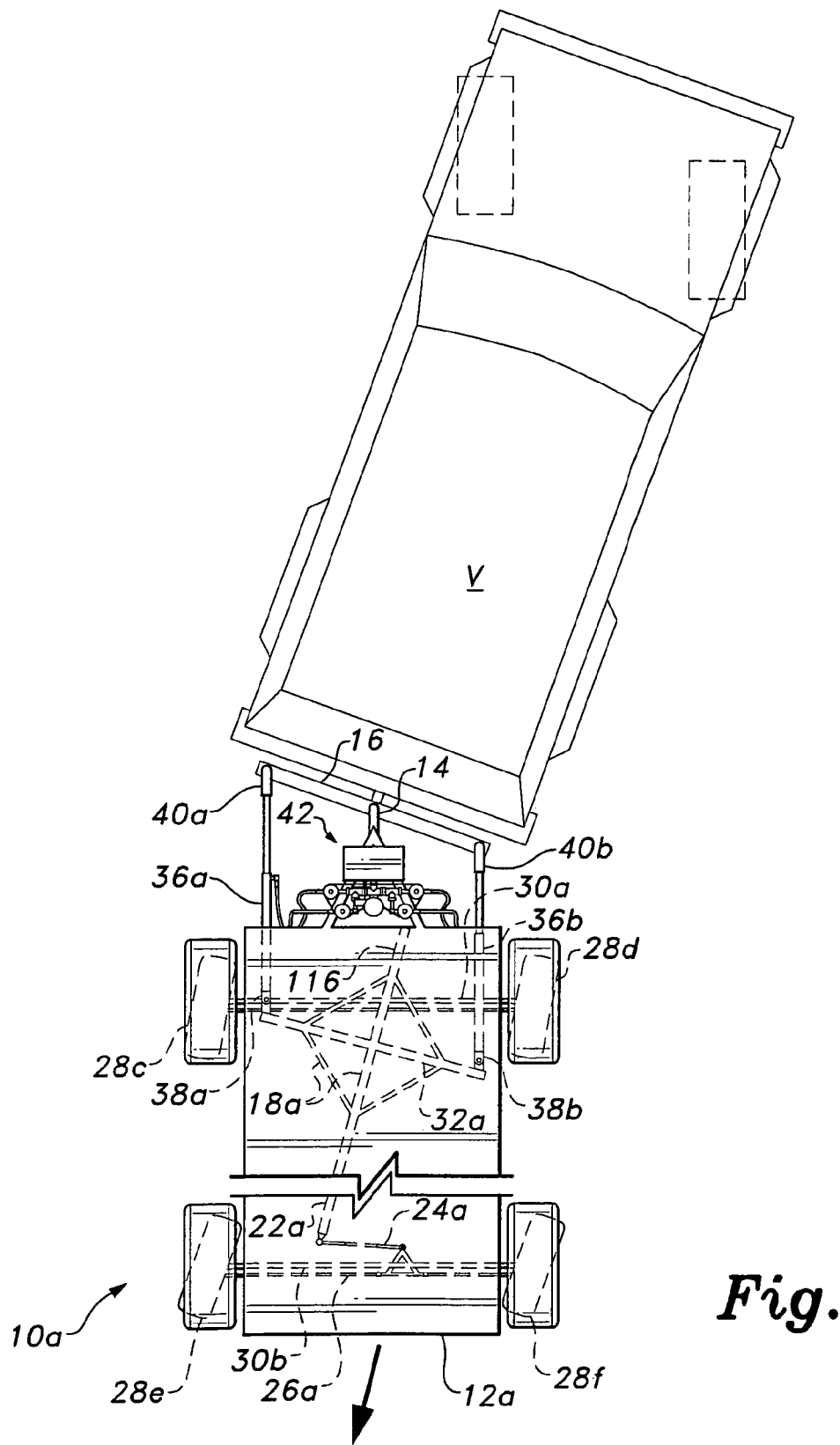
FIG. 5 is a schematic top plan view of an alternative embodiment of trailer and trailer steering mechanism according to the present invention, wherein the trailer has forward free-steering wheels and a rearward axle having steerable wheels thereon controlled by a steering mechanism.

When the tow vehicle V towing the multiple axle trailer 10a of FIG. 5 is towing the trailer forward, the hydraulic system is open to allow hydraulic fluid to flow freely between the two cylinders 36a and 36b, thereby allowing the two cylinders to extend and retract in accordance with articulation between the tow vehicle V and trailer 10a without actuating the steering frame 18a and associated steering linkage to the rear axle 30b. Thus, the rear wheels and tires 28a, 28f track in a straight line relative to the centerline of the trailer 10a, during forward travel. The two front wheels 28c, 28d steer freely to allow the trailer 10a to negotiate turns while traveling forward.

When the twin-axle trailer 10a is to be backed, the two hydraulic cylinders or struts 36a, 36b are hydraulically locked, as in the case of the single-axle trailer 10. This results in any articulation between the tow vehicle V and trailer 10a rotating the steering frame 18a, thus steering the rear wheels 28e, 28f. The front wheels 28c, 28d are free to steer or articulate directionally as required to enable the tow vehicle V and two-axle trailer 10a combination to negotiate turns as required.

Figure 12A:
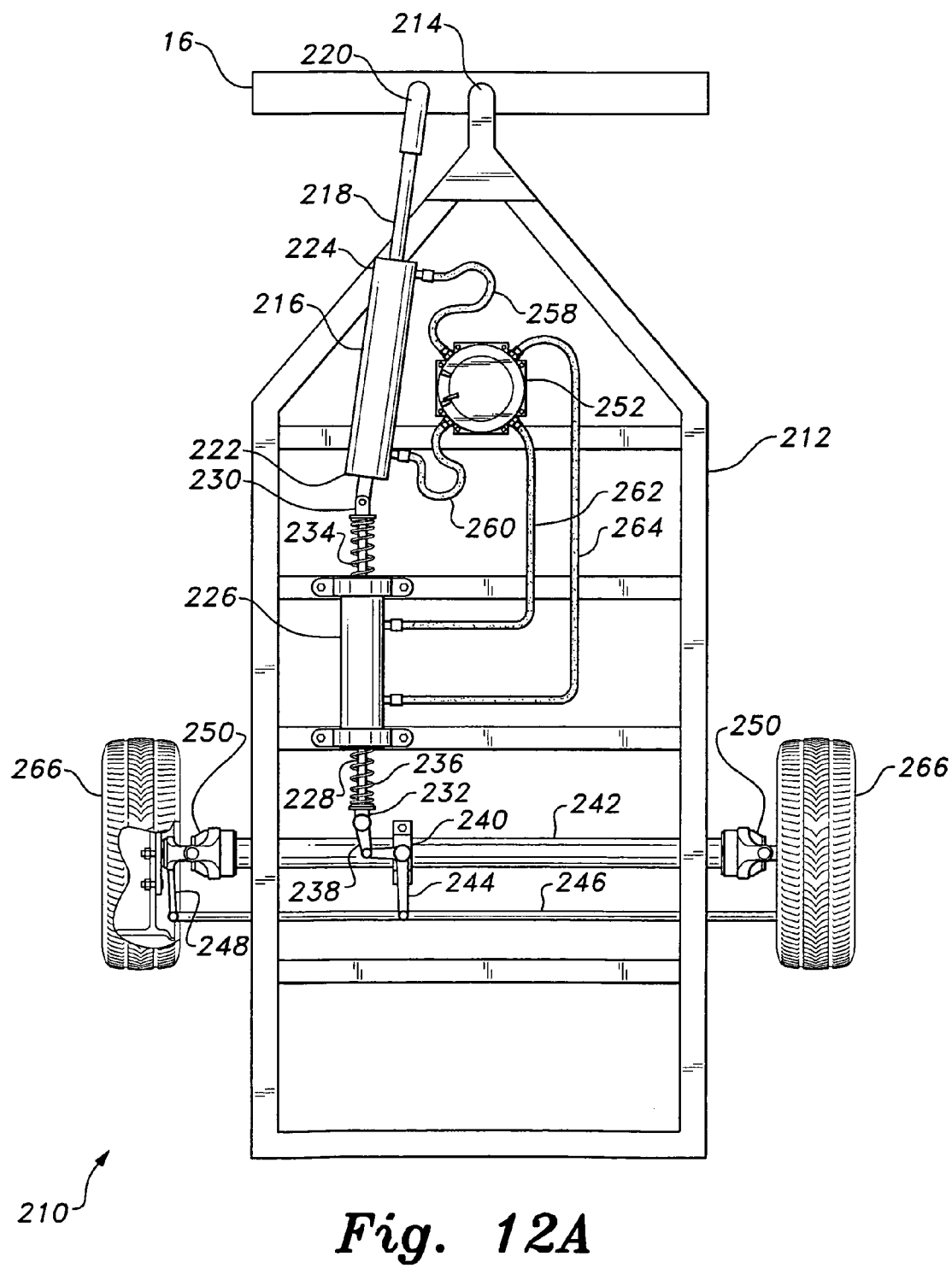
FIG. 12A is a top plan view of a trailer frame incorporating an alternative embodiment trailer steering mechanism employing an non-powered, completely hydraulic system, with the trailer wheels set in their neutral, straight ahead orientation.

FIGS. 12A through 16 illustrate another embodiment of the trailer steering mechanism and various components thereof, wherein a non-powered, purely hydraulic system is used to control the steering of the trailer during backing maneuvers. The hydraulic system of the embodiment of FIGS. 12A through 16 is completely sealed, i.e., it is not vented to atmosphere and does not utilize any pneumatics, pumps, or other power systems in its operation. FIGS. 12A, 13A, and 14A provide top plan views of the trailer and its frame and steering mechanism with the wheels straight (FIG. 12A) and while turning to the right and left (FIGS. 13A and 14A).

The trailer 210 includes a frame 212 having a forwardly extending rigid tongue 214, with the tongue 214 being removably and pivotally hitched to a lateral hitch bar 16 attached to the tow vehicle V (as shown in FIGS. 1, 3, 4, and 5). The trailer 210 differs from the trailer 10 embodiment of FIGS. 1 through 5, in that it is conventional until modified by the addition of the steering system described herein. The hitch bar 16 is rigidly and immovably secured to the tow vehicle V by means of a conventional receiver hitch or the like, as in the trailer and hitch embodiment of FIGS. 1 through 5. The hitch bar 16 may be identical to the three-ball hitch bar 16 of FIGS. 1 and 3 through 5, but actually requires only one central ball (or other hitch attachment) for the trailer tongue 14 coupler and one laterally offset ball (or other hitch attachment) for the steering connection (described in detail further below).

A first or steering hydraulic cylinder 216 is installed at the forward portion of the trailer 210. The steering cylinder 216 has a selectively extendible rod 218 with a tow vehicle (or hitch bar) connection end 220 and a cylinder base 222 opposite the rod 218. The steering cylinder 216 is a conventional double-acting unit, i.e., retraction of the strut or rod 218 will actuate the internal piston to draw hydraulic fluid into the forward end or portion 224 of the cylinder and expel fluid from the cylinder base end or portion 222, with extension of the strut or rod 218 expelling fluid from the forward end portion 224 and drawing fluid into the cylinder base end or portion 222. It should be noted that while the term "steering cylinder" is used for this forward cylinder 216, it only acts to operate the trailer steering when the trailer is backing. The rod 218 of this steering cylinder 216 is free to extend and retract during forward operation of the trailer 210, with fluid moving freely to and from the cylinder 216, as described above.

A second, rearwardly disposed or axle lock cylinder 226 is immovably affixed to the trailer frame 212, e.g., by means of conventional clamps and bolts, etc., and connected in tandem with the forward steering cylinder 216. This axle lock cylinder 226 serves to lock the wheels of the trailer 210 in a straight ahead orientation when the trailer is being pulled forward, in order that the trailer will track straight behind the towing vehicle. The axle lock cylinder 226 is hydraulically open during backing maneuvers to allow the steering linkage to which it is attached to articulate as required.

The axle lock cylinder 226 is a double-rod steering cylinder modified to function in this manner. The axle lock cylinder 226 has an elongated cylindrical body having end caps at opposite ends of the body. A piston 270 is slidable within the cylindrical body, and defines a forward chamber and a rearward chamber that normally contain hydraulic fluid, the piston 270 having a piston seal around its periphery to prevent fluid flow around the piston 270 between the forward and rearward chambers. Ports are provided on the cylinder body for connecting the forward and rearward chambers to a hydraulic valve 252, providing hydraulic fluid from a tank or reservoir.

The axle lock cylinder 226 has a rod assembly 228 that includes a front or forward rod 230 extending from the piston 270 and slidable through a hole in the forward end cap, the hole in the cap having a rod seal or packing to prevent fluid leakage. The front rod 230 is connected directly to the base end 222 of the steering cylinder 216. The rod assembly also includes a rear of rearward rod 232 extending from the piston 270 opposite the front rod, the rear rod 232 being slidable through a hole in the rear end cap, the hole having a rod seal or packing to prevent fluid leakage. The rear rod 232 is attached to the steering linkage of the trailer 10, as discussed further below.

The axle lock cylinder is modified by placing helical compression springs 234 and 236 coaxially around the front rod 230 and rear rod 232, respectively. The compression springs 234 and 236 are confined between the cylinder's end caps and annual flanges fixed around the distal ends of the front rod 230 and the rear rod 232, respectively. The springs 234 and 236 normally bias the piston 270 so that the piston 270 is centered within the cylinder body.

As shown in FIG. 12A, the rear rod 232 is pivotally connected to a connector link 238, which is, in turn, connected to the Pitman arm assembly 240 of the trailer steering linkage. The Pitman arm assembly 240 is immovably affixed (e.g., clamped by conventional bolts, etc.) to the laterally disposed axle 242 of the trailer 210, the Pitman arm 244 extending therefrom. The Pitman arm 244 is pivotally connected to the tie rod 246. The opposite ends of the tie rod 246 are pivotally connected to steering arms 248 extending from the steering hubs 250, which are, in turn, mounted to the axle spindles. The steering hub and axle spindle assembly is shown in detail in FIG. 16, and discussed further below. The geometry of the steering linkage illustrated in FIGS. 12A, 13A, and 14A may be adjusted as required to provide the desired operation, and/or additional idler arms and links, end links, etc. may be incorporated with the above-described trailer steering linkage, as required. The above-described steering system is generally conventional in powered vehicles, but is not found on conventional trailers having directionally fixed wheels, particularly as provided in a kit that may be installed upon an existing trailer having directionally fixed wheels to convert the trailer to a steerable trailer.

Hydraulic flow to and from the steering and axle lock cylinders 216 and 226 is controlled by a hydraulic control valve 252 that is affixed to the trailer frame 212 or other trailer structure. This control valve 252 is shown in detail in FIG. 15 of the drawings. The valve 252 is somewhat similar to the hydraulic control valve 70 of FIG. 9, but the internal valving is rearranged to provide the required operation of the steering control system of the embodiment of FIGS. 12A through 16. A hydraulic tank or reservoir similar to the tank or reservoir 54 provided with the system of FIGS. 1 through 11, may be incorporated with the embodiment of FIGS. 12A through 16 as well. The valve 252 includes a stationary outer body 254 having first through fourth ports 254a through 254d therein. A rotary inner valve member 256 includes a series of four valve passages 256a through 256d and four flow blocking ports 256e through 256h therein, the inner rotary valve passages and blocking ports 256e through 256h selectively aligning with the four ports 254a through 254d of the outer body to provide or restrict hydraulic fluid flow, as desired.

Figure 15:
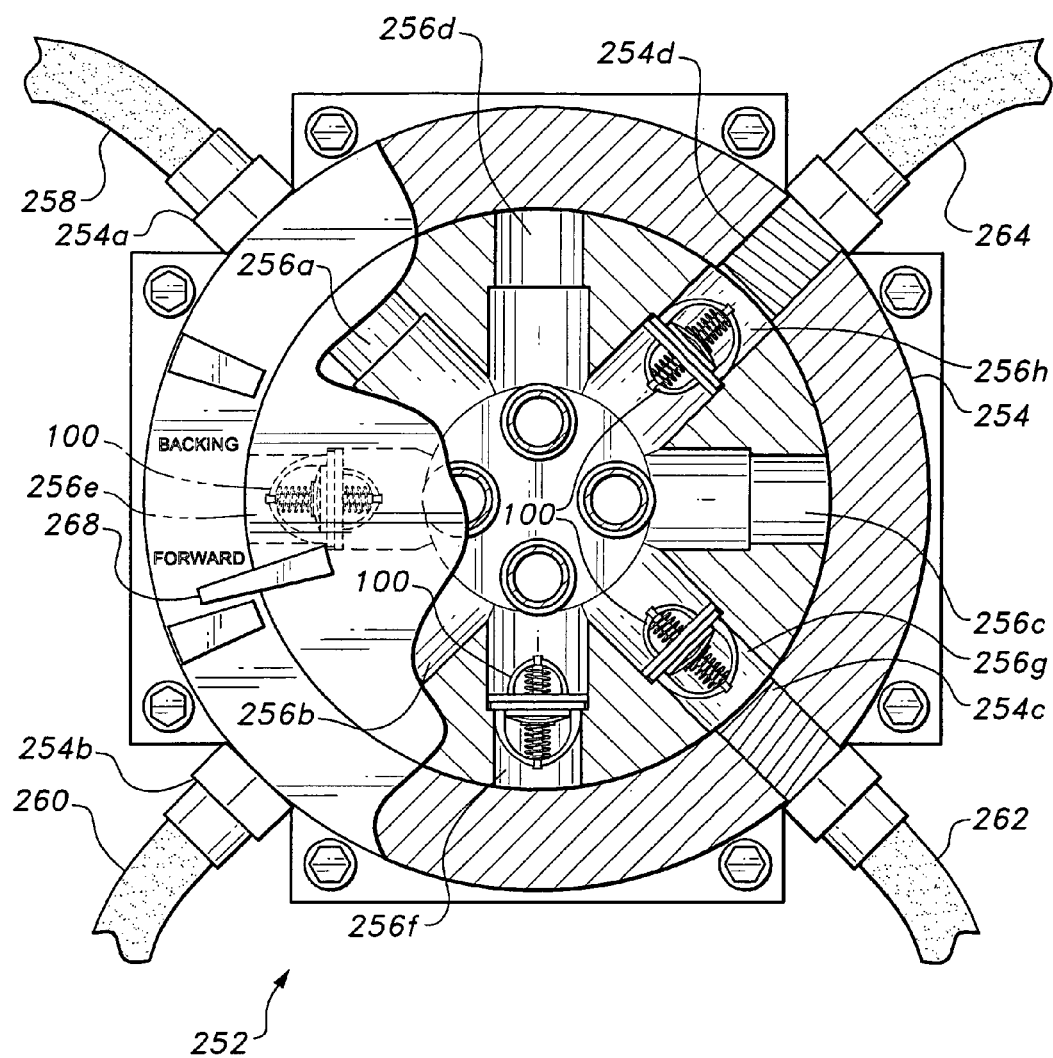
FIG. 15 is a top plan view in partial section of the hydraulic control valve used to control the system of FIGS. 12A through 14B.

The first through fourth flow blocking ports 256e through 256h include two-way relief valves 100 therein. The relief valves 100 of the control valve 252 of FIG. 15 are essentially the same as the relief valve 100 illustrated in detail in FIG. 8 of the drawings and described further above. It will be recognized that these valves 100 may completely block hydraulic fluid flow therethrough for all practical purposes if sufficient spring pressure is provided. These valves 100 are intended only to allow sufficient flow to provide some movement of the steering assembly and cylinders, e.g., in the event of the system reaching a physical limit (steering stop, etc.), in order to avoid physical damage to the system. These valves 100 completely block fluid flow therethrough under normal conditions. Alternatively, the valves 100 may be replaced with solid bodies to completely block fluid flow therethrough at all times, if so desired.

The first outer valve port 254a is connected to the forward end 224 of the steering cylinder 216 by a first hydraulic line 258, while the second outer valve port 254b is connected to the opposite cylinder base end 222 of the steering cylinder 216 by a second hydraulic line 260. The third outer valve port 254c connects to the forward end of the axle lock cylinder 226, i.e., the end closest to the steering cylinder, via a third hydraulic line 262, while the fourth outer valve port 254d connects to the opposite rearward end of the axle lock cylinder 226, i.e., the end closest to the steering linkage, via a fourth hydraulic line 264.

When the trailer 210 is being pulled forward, the trailer wheels 266 are locked in their straight ahead orientation, as shown in FIG. 12A. The hitch bar 16 is also shown square or perpendicular to the longitudinal axis of the trailer 210 in FIG. 12A, as would be the case when the towing vehicle is traveling straight ahead with the trailer 210 in tow. However, the hydraulic system of the trailer steering mechanism of the embodiment of FIGS. 12A through 16 allows the rod 218 of the forward or steering hydraulic cylinder 216 to extend and retract according to turns by the towing vehicle, while the trailer wheels 266 remain straight. This is due to the control valve 252 being set as shown in FIG. 15, with the selector switch 268 being set for forward operation. (It will be seen that this selector switch 268 may be manually operated, or actuated electrically or by some other remote means of control, as desired.) This aligns the first and second outer valve ports or passages 254a and 254b with the open first and second inner valve passages 256a and 256b, thus allowing hydraulic fluid to flow back and forth through the control valve 252 to the first and second hydraulic lines 258 and 260, and thus to the opposite ends of the forward steering cylinder 216. Accordingly, even when the axle lock cylinder 226 is locked to hold the trailer wheels 266 straight, as shown in FIG. 12A, the free movement of the steering cylinder rod 218 due to the open fluid passages 254a, 256a and 254b, 256b allows the towing vehicle and its attached hitch bar 16 to turn as desired.

Hydraulic fluid flow to the rearward axle lock cylinder 226 is simultaneously shut off when flow is permitted to the forward steering cylinder 216 as described above. It will be seen in FIG. 15 that the rotary inner valve third and fourth blocking ports 256g and 256h, and their highly restrictive relief valves 100, are aligned with the respective outer body passages or ports 254c and 254d. This effectively shuts off all hydraulic fluid flow to the rearward axle lock cylinder 226 through its hydraulic lines 262 and 264, thus effectively locking the axle lock cylinder 226 to render it immobile. As the rear rod 230 of the axle lock cylinder 226 is connected directly to the steering linkage, the steering linkage cannot articulate or move and is held straight ahead so long as the rod assembly 228 of the axle lock cylinder 226 is neutral.

When the trailer 210 is to be backed, the selector switch 268 is moved (manually or by electrical or other remotely controlled means) to the backing position, thus rotating the inner rotary valve member 256 forty-five degrees in the clockwise direction. This aligns the first inner valve blocking port 256e with the first outer valve body passage 254a, and the second inner valve passage 256f with the second outer valve body passage 254b. As these two inner valve blocking ports 256e and 256f have highly restricted flow due to the restrictor valves 100 installed therein, it will be seen that hydraulic flow is essentially cut off to the forward steering cylinder 216 for backing maneuvers, thus hydraulically locking the steering cylinder 216 to prevent extension or retraction of its rod 218.

Simultaneously with the above operation, the third inner valve passage 256c is rotated to align with the third outer body valve port 254c, and the fourth inner valve passage 256d is aligned with the fourth outer body valve port 254d. These two inner valve passages 256c and 256d are completely open, i.e., they have no hydraulic fluid restriction or blockage therein. This allows unimpeded hydraulic fluid flow back and forth through the control valve 252, and thus through the second or axle lock cylinder 226 to permit the free movement thereof.

Figure 13A:
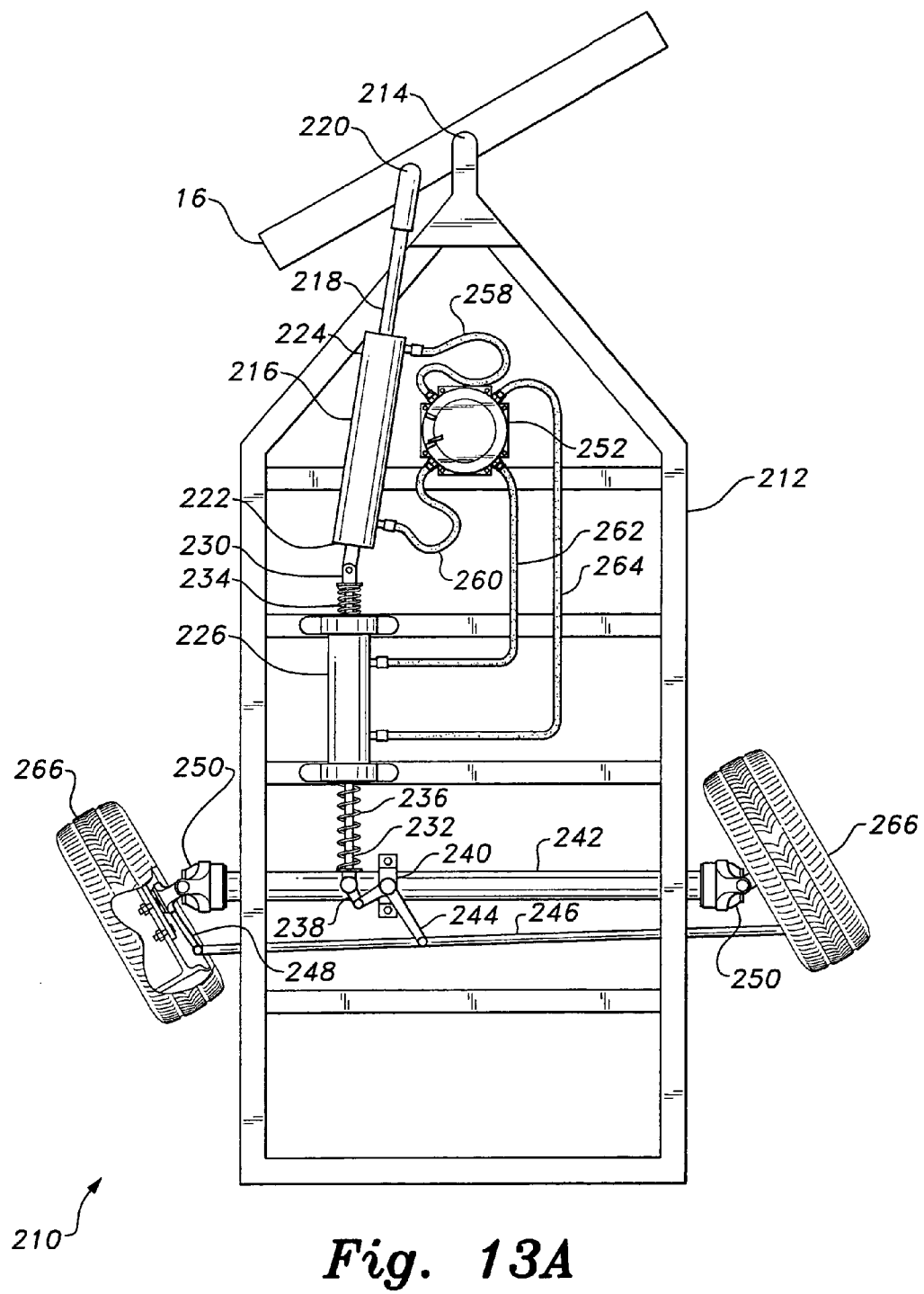
FIG. 13A is a top plan view of the trailer frame and steering mechanism of FIG. 12A, showing the trailer wheels oriented for a backing maneuver to the right.

FIG. 13A provides an illustration of the operation of the trailer backing system when the towing vehicle begins to back to the right. In such a scenario, the trailer 210 will initially move straight to the rear. The front of the tow vehicle swings to the left as its forwardly disposed steering wheels are turned to the right during backing. This will misalign the rear of the towing vehicle and its hitch bar 16 relative to the trailer 210, generally as shown in FIG. 13A. When this occurs, the rod assembly 218 of the forward or steering cylinder 216 is driven rearwardly due to the articulation between the hitch bar 16 and trailer 210, thus driving the hydraulically locked steering cylinder 216 rearwardly as well.

Figure 14A:
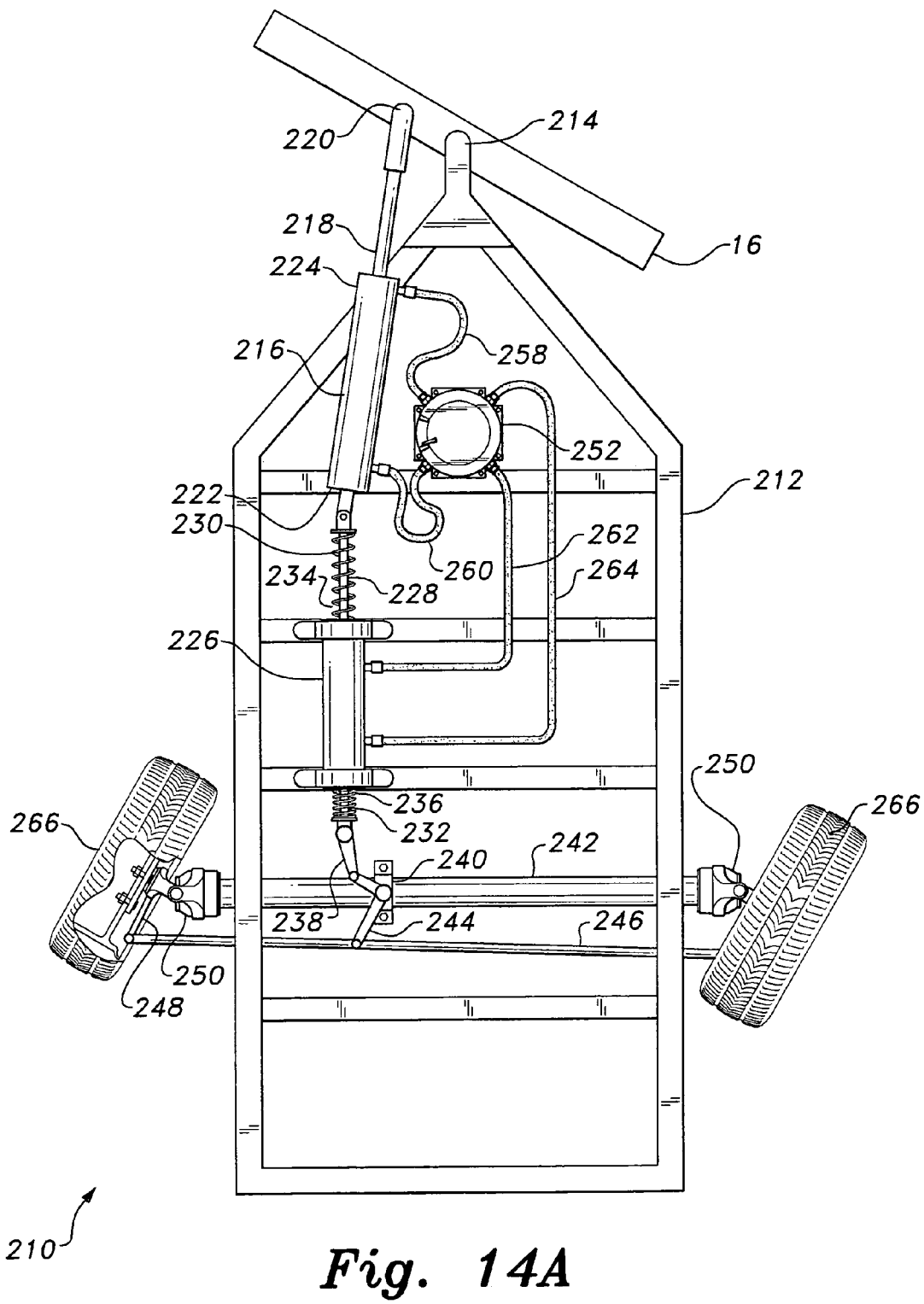
FIG. 14A is a top plan view of the trailer frame and steering mechanism of FIGS. 12A and 13A, showing the trailer wheels oriented for a backing maneuver to the left.

As the rearward axle lock cylinder 226 is immovably affixed to the trailer structure or frame 212, the front rod 230 is forced rearward, compressing the spring 234. This extends the rear rod 232 and expands spring 236, thereby actuating the steering linkage, as shown in FIG. 13A, to swing the trailer 210 toward the right, thus aligning the trailer with the towing vehicle as the backing maneuver continues. FIG. 14A illustrates the same process with the turning and steering directions being opposite those shown in FIG. 13A, i.e., with the towing vehicle initially backing toward the left.

Once the backing maneuver has been completed, the selector switch 268 of the control valve 252 is returned to its forward setting, generally as illustrated in FIG. 15. This opens the flow between the two ends of the forward steering cylinder 216 and closes the flow to the rearward axle lock cylinder 226 to lock the axle lock cylinder hydraulically, as described further above. It will be seen that if this is done while the trailer wheels 266 are turned, e.g., as shown in FIG. 13A or 14A, the wheels will remain locked angularly relative to the trailer 210, and the trailer will not track in a straight line behind the towing vehicle unless some means is provided to overcome this problem.

FIGS. 12B through 14B provide elevation views in section of the axle lock cylinder 226 corresponding to the respective trailer steering scenarios illustrated respectively in FIGS. 12A through 14A.

Figure 12B:
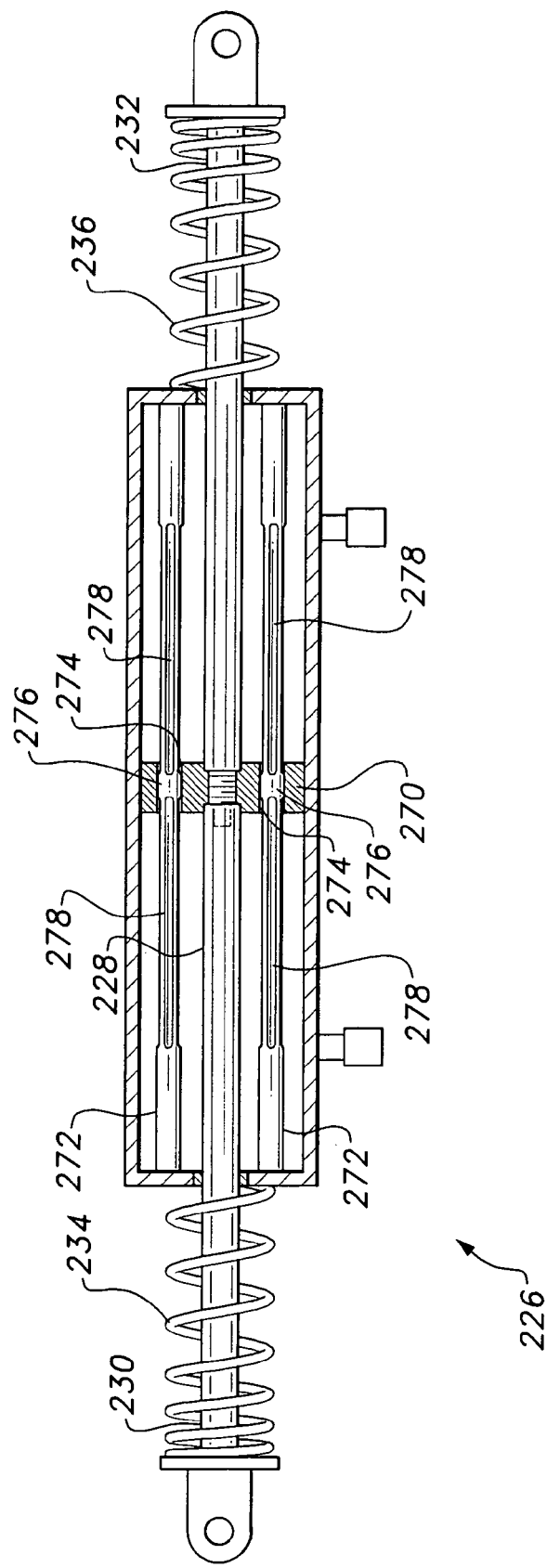
FIG. 12B is a top plan view in section of the axle lock cylinder, showing its internal configuration when in its neutral position as would be required in the trailer wheel orientation shown in FIG. 12A.
Figure 13B:
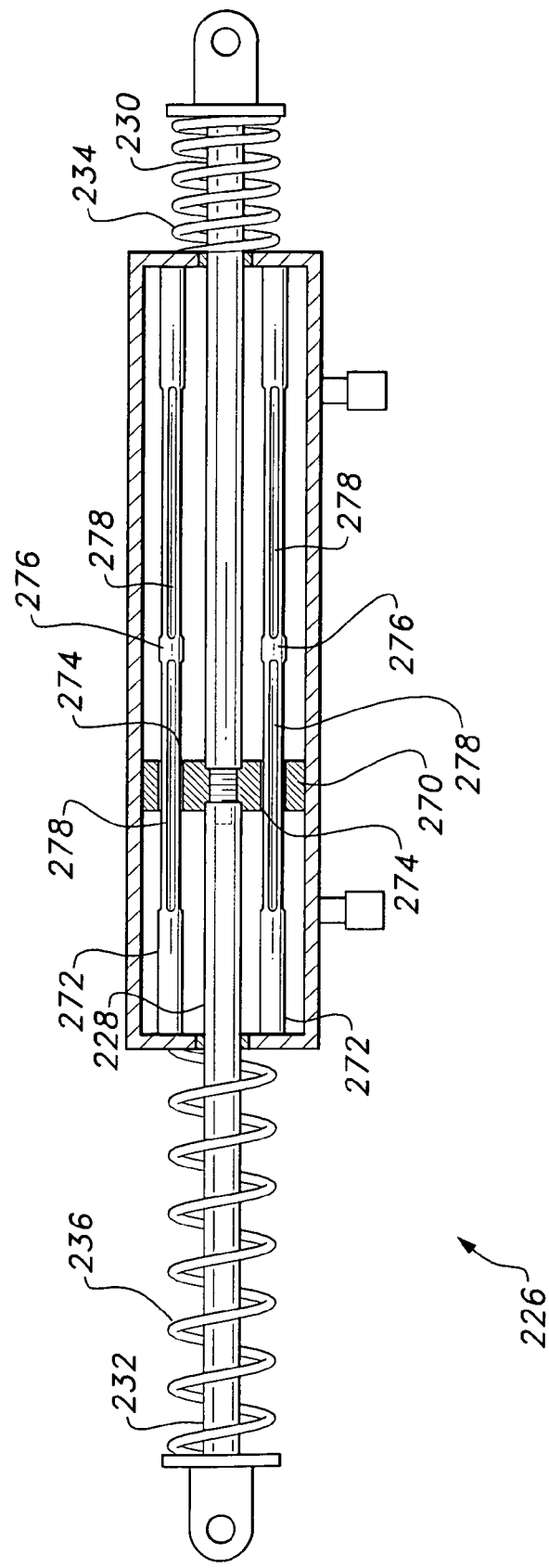
FIG. 13B is a top plan view in section of the axle lock cylinder of FIG. 12B, showing its internal configuration when driven to orient the trailer wheels as shown in FIG. 13A.
Figure 14B:
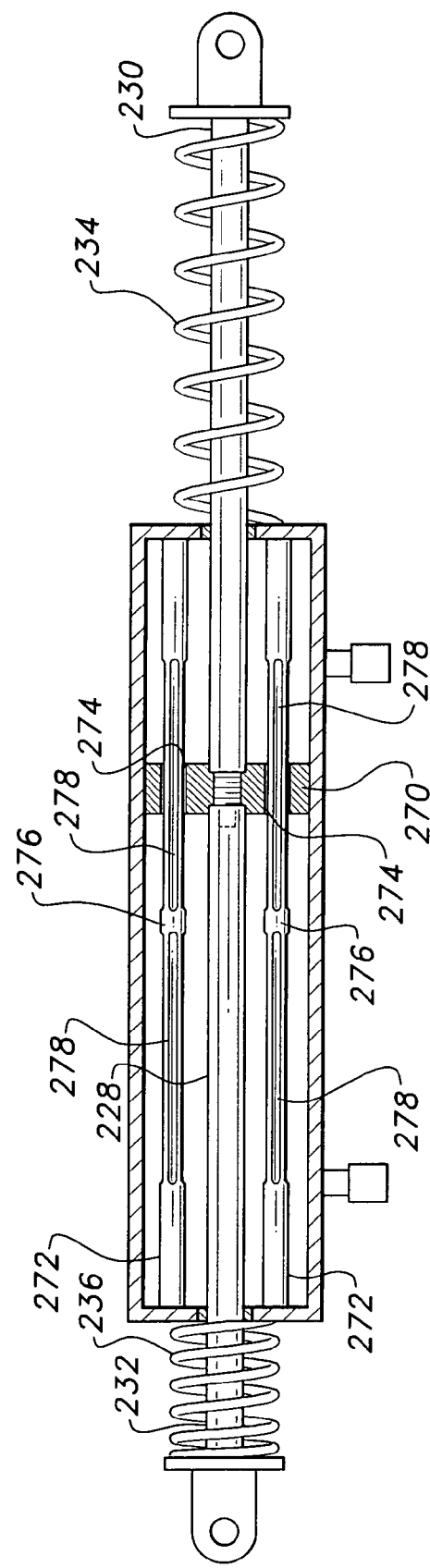
FIG. 14B is a top plan view in section of the axle lock cylinder of FIGS. 12B and 13B, showing its internal configuration when driven to orient the trailer wheels as shown in FIG. 14A.

The axle lock cylinder 226 has been further modified to include at least one valve shaft 272 therein, with FIGS. 12B, 13B, and 14B showing two such shafts 272 within the cylinder 226. The valve shafts 272 extend axially between the opposite end caps of the cylinder 226, and are immovably affixed relative to the body of the cylinder 226. The valve shafts 272 pass through corresponding passages 274 through the piston 270. The valve shafts 272 each have a centrally located seal portion 276 thereon, the seal portion having a diameter essentially equal to that of the passage 274 through the piston 270. Thus, essentially all hydraulic flow within the cylinder 226 is blocked from the forward chamber to the rearward chamber when the piston 270 is centered within the body of the cylinder 226, the seal portions 276 being seated within the valve passages 274, and the control valve 252 is set for forward operation as shown in FIG. 15. The seal passages 274 have O-rings or other seal or packing material about their periphery to prevent fluid leakage between the forward and rearward chambers when the seal portions 276 are seated in the passages 274.

The valve shafts 272 further have relief portions 278 (e.g., flutes or grooves) extending axially between the seal portion 276 and the ends attached to the end caps of the body of the axle lock cylinder 226. Thus, when the piston 270 is displaced from the center of the cylinder body, hydraulic fluid may flow along the flutes 278 through the passages 274 in the piston 270 and between the forward and rearward chambers. The flutes or grooved portions 278 of the valve shafts 272 have raised portions of equal diameter to the valve passages 274 to prevent flexure and vibration of the valve shafts within the valve passages 274 when the seal portions 276 are unseated from the valve passages 274. Alternatively, the valve shafts 272 may have tapered or necked down diameters extending between the seal portions 276 and the end caps, if desired, to allow hydraulic fluid to flow through the valve passages 274 when the seal portions 276 are unseated from the valve passages 274.

FIG. 13B corresponds with the trailer 210 configuration of FIG. 13A, i.e., with the trailer wheels 266 turned to the right during backing. In this scenario, the control valve 252 of FIG. 15 would have its selector switch 268 turned to the backing position, thus closing the hydraulic flow through the first and second hydraulic lines to the forward steering cylinder 216 and locking that cylinder and its rod 218 relative to one another. At the same time the third and fourth hydraulic lines 262 and 264 are opened, thereby allowing flow between the control valve and the forward and rearward chambers of the axle lock cylinder 226. As the hitch bar 16 is turned as shown in FIG. 13A, the hydraulically locked forward cylinder rod 218 is pushed rearwardly, thus pushing the steering cylinder 216 rearwardly as well. This extends the rear rod 232, thus actuating the steering linkage to turn the wheels 266 to the right, as shown in FIG. 13A. Hydraulic fluid flow is also provided through the passages 274, as the piston 270 is offset from the center of the cylinder body, unseating the seal portions 276 of the valve shafts 272.

FIGS. 14A and 14B correspond with one another as well, but show the trailer wheels 266 as positioned when the trailer 210 is being backed to the left. The control valve 252 is set to the backing configuration, i.e., with the forward steering cylinder 216 hydraulically locked and the rearward axle lock cylinder 226 hydraulically open, as in the case of the right turn shown in FIGS. 13A and 13B. However, the forward cylinder rod 218 and its hydraulically locked forward or steering cylinder 216 are drawn forward in FIG. 14A, thus drawing the rear rod 232 forward into the body of the axle lock cylinder 226 and compressing spring 236. This results in the steering linkage being turned as shown in FIG. 14A.

When the backing maneuver has been completed, the selector switch 268 of the control valve 252 is again switched to the forward position, as shown in FIG. 15. This opens hydraulic flow to the forward steering cylinder 216, so the rod 218 may extend and retract freely as the trailer follows the tow vehicle during turning maneuvers while moving forward with the trailer wheels 266 locked in their straight ahead positions as shown in FIG. 12A.

This also closes the hydraulic flow to the rearward axle lock cylinder 226. However, the axle lock cylinder 226 is not hydraulically locked immediately if the wheels of the trailer are not straight and aligned with the towing vehicle, because the piston 270 is not centered and hydraulic fluid is still free to flow through the valve passages 274 in the piston 270. As the trailer continues to turn and the bias springs 234, 236 continue to exert their effect. the axle 242 swings until the trailer wheels are aligned straight behind the tow vehicle, at which time the piston 270 is centered, the seal portions 276 seat in the valve passages 274, and hydraulic pressure in the forward and rearward chambers lock the trailer axle 242 so that the axle cannot turn again until the trailer is backed again.

The trailer steering mechanism of the embodiment of FIGS. 12A through 16 may be provided as a kit for the modification of a conventional trailer with non-steerable wheels to a trailer having steerable wheels, if so desired. The rearward or axle lock cylinder 226 and the control valve 252 are both bolt-on attachments to an existing trailer structure or frame, and the forward or steering cylinder 216 attaches only to the forward or steering cylinder attachment end 230 of the axle lock cylinder rod 228 and to the hitch bar 16. Only the Pitman assembly 240 of the steering linkage attaches to the axle 242 of the trailer structure, and this attachment may be by means of a bolt-on collar or the like.

Figure 16:
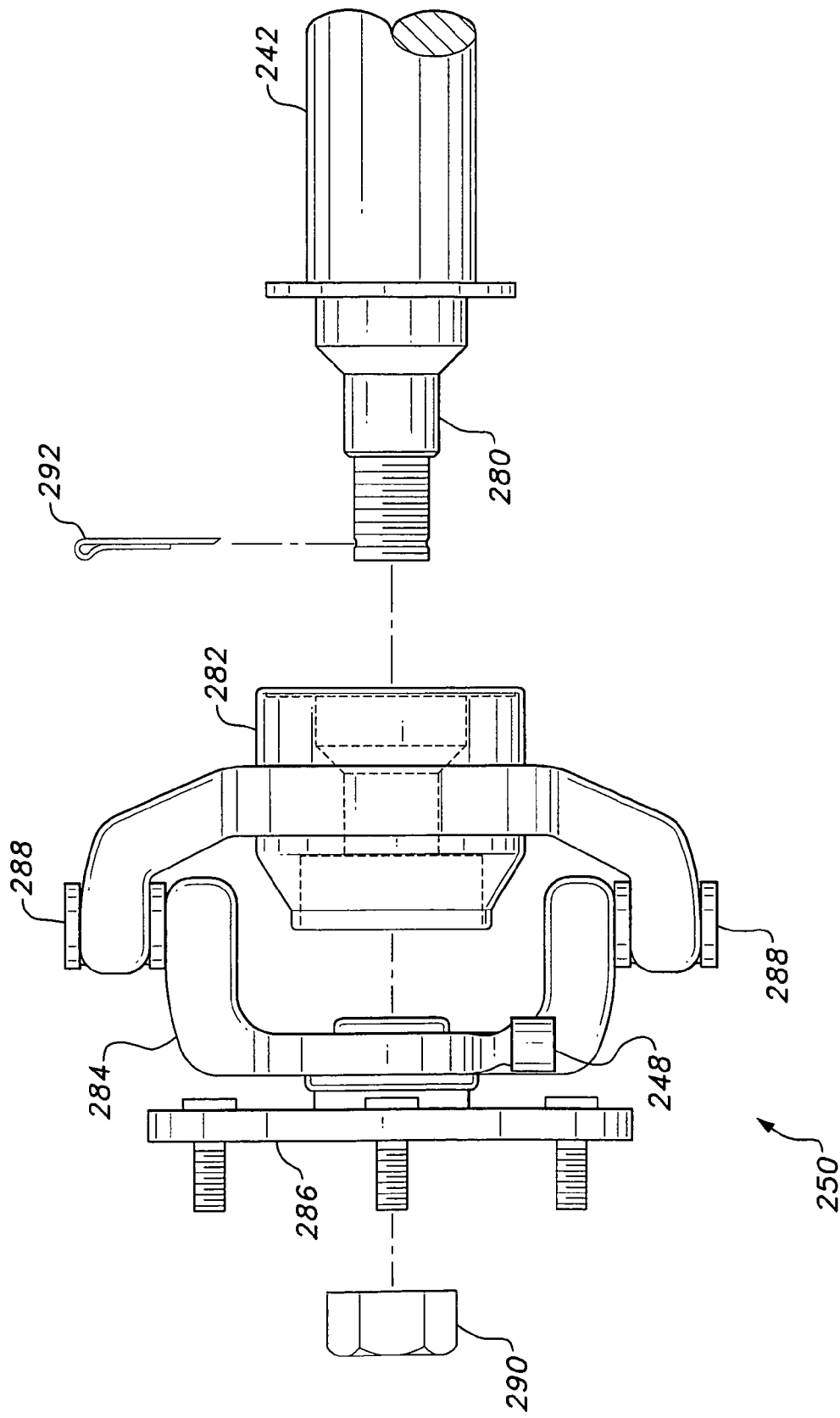
FIG. 16 is an exploded side elevation view of a steering hub that may be installed upon the conventional wheel spindle of a trailer to provide for trailer wheel steering.

The only other components required to convert a conventional trailer to a steering trailer as shown in FIGS. 12A, 13A, and 14A, are a pair of steerable hubs 250, the left one of which is shown in detail in FIG. 16. FIG. 16 shows one end of the axle 242 with the wheel and conventional non-steering hub removed therefrom to expose the spindle 280. The steerable hub 250 comprises three basic components, i.e., a fixed hub attachment 282 and a steerable wheel carrier 284 with its rotating wheel mounting flange 286. The wheel carrier 284 is pivotally attached to the hub 282 by conventional kingpins 288 or the like, thus permitting the wheel carrier 284 to swivel or steer relative to the fixed hub attachment 282. The steering arm 248 shown in plan view in FIGS. 12A, 13A, and 14A is shown in end view in the elevation view of FIG. 16.

Once the conventional hub has been removed from the spindle 280, as shown in FIG. 16, the steerable hub assembly 250 is placed thereon. The original nut 290 is threaded back onto the threaded end of the spindle to lock the hub 282 thereon, and a cotter pin 292 is installed through the nut 290 and threaded end of the spindle 280. The tie rod 246 is then attached to the steering arm 248 to complete the task. Conversion of the opposite axle end is accomplished in the same manner, using a mirror image steerable hub assembly to that shown in FIG. 16.

In conclusion, the trailer steering mechanism in its various embodiments provides a means for greatly simplifying the steering or guidance of a trailer during backing maneuvers. The system may automatically switch from a directionally locked mode for forward travel to steering mode for backing maneuvers, or may, alternatively, be manually switched, if so desired. While the trailer steering mechanism is particularly well suited to trailers having a single axle and two wheels, it may be adapted to other types of trailers having multiple axles as well, with little modification. Accordingly, the trailer steering mechanism will prove to be extremely popular with vehicle operators who have need to tow and back a trailer from time to time.

It is to be understood that the present invention is not limited to the embodiments described above, but encompasses any and all embodiments within the scope of the following claims.

I claim:

1. A sealed, pumpless hydraulic trailer steering mechanism for a trailer, the trailer having steerable wheels, a frame, and a rigid tongue pivotally attachable to a tow vehicle, the trailer steering mechanism comprising:
   a hydraulic steering cylinder having a selectively extendable rod and a cylinder base opposite the rod, the rod having a tow vehicle connection end;
   a double-rod hydraulic axle lock cylinder adapted for being immovably affixed to the trailer frame, the axle lock cylinder having a front rod directly connected to the cylinder base of the steering cylinder and a rear rod;
   a steering linkage adapted for connection between the axle lock cylinder and the steerable wheels of the trailer; and
   a hydraulic control valve communicating hydraulically with the steering cylinder and the axle lock cylinder, the control valve selectively opening hydraulic flow to the steering cylinder and closing hydraulic flow to the axle lock cylinder when in forward operating mode and closing hydraulic flow to the steering cylinder and opening hydraulic flow to the axle lock cylinder when in backing operating mode.

2. The trailer steering mechanism according to claim 1, further including a trailer, the trailer having a frame with at least one axle laterally disposed thereacross, the axle having first and second steerable wheels extending therefrom, the frame having a rigid tongue pivotally attachable to a tow vehicle.

3. The trailer steering mechanism according to claim 2, wherein said trailer axle has mutually opposed first and second spindles extending therefrom, the trailer steering mechanism further comprising first and second steering hubs mounted on the spindles, the hubs being connected to the steering linkage.

4. The trailer steering mechanism according to claim 1, wherein the axle lock cylinder comprises:
   an elongated cylindrical housing having end caps at opposing ends of the housing, the front and rear rods being slidably disposed through the end caps;
   a piston slidably disposed within the housing, the front and rear rods extending from the piston, the piston having at least one valve shaft passage disposed therethrough, the piston defining first and second hydraulic fluid chambers within the housing, the chambers having volumes varying according to movement of the rods and piston within the cylinder housing, the trailer wheels being aligned straight with the tow vehicle when the piston is centered between the end caps; and
   at least one valve shaft disposed within the axle lock cylinder, the at least one valve shaft extending axially between the end caps, the valve shaft passing through the valve shaft passage of the piston, the valve shaft having mutually opposed first and second relief portions defined therein and a seal portion disposed centrally between the relief portions, the seal portion selectively blocking hydraulic fluid flow through the piston when the piston is substantially centered in the cylinder housing so that the seal portion is seated in the valve shaft passage in the piston, the seal portion allowing hydraulic fluid flow along the relief portions and through the piston when the piston is axially offset within the cylinder housing so that the seal portion is not seated in the valve shaft passage.

5. The trailer steering mechanism according to claim 4, further including first and second helical springs coaxially disposed upon the front and rear rods, respectively, external to the housing, the front and rear rods having a distal end and a flange around the distal end, the springs being disposed between the end caps and the flanges, the spring biasing the piston to the center of the cylinder housing.

6. The trailer steering mechanism according to claim 1, wherein the control valve further includes:
   first and second flow passages selectively connected to the steering cylinder;
   first and second flow blocking ports selectively connected to the steering cylinder;
   third and fourth flow passages selectively connected to the axle lock cylinder;
   third and fourth flow blocking ports selectively connected to the axle lock cylinder; and
   a selector valve, the selector valve having a forward operating position simultaneously connecting the first and second flow passages to the steering cylinder and the third and fourth flow blocking ports to the axle lock cylinder, and a backing operating position simultaneously connecting the first and second flow blocking ports to the steering cylinder and the third and fourth flow passages to the axle lock cylinder.

7. The trailer steering mechanism according to claim 6, further including a plurality of pressure relief valves disposed within the first and second flow blocking ports to the steering cylinder and within the third and fourth flow blocking ports to the axle lock cylinder.

8. A sealed, pumpless hydraulic trailer steering mechanism and a steerable trailer, comprising in combination:
    a trailer having a frame and at least one axle laterally disposed across the frame, the axle having first and second steerable wheels extending therefrom and a steering linkage operably connected to the steerable wheels, the frame having a rigid tongue pivotally attachable to a tow vehicle:
    a hydraulic steering cylinder, the steering cylinder having a selectively extendable rod and a cylinder base opposite the rod, the rod having a tow vehicle connection end;
    a double-rod hydraulic axle lock cylinder immovably affixed to the trailer frame, the axle lock cylinder having a front rod directly connected to the cylinder base of the steering cylinder and a rear rod connected to the steering linkage; and
    a hydraulic control valve communicating hydraulically with the steering cylinder and the axle lock cylinder, the control valve selectively opening hydraulic flow to the steering cylinder and closing hydraulic flow to the axle lock cylinder when in forward operating mode and closing hydraulic flow to the steering cylinder and opening hydraulic flow to the axle lock cylinder when in backing operating mode.

9. The trailer steering mechanism and steerable trailer according to claim 8, further including:
    mutually opposed first and second spindles extending from the axle; and
    first and second steering hubs mounted on the wheel spindles, the hubs being connected to the steering linkage.

10. The trailer steering mechanism and steerable trailer according to claim 8, wherein the axle lock cylinder comprises:
    an elongated cylindrical housing having end caps at opposing ends of the housing, the front and rear rods being slidably disposed through the end caps;
    a piston slidably disposed within the housing, the front and rear rods extending from the piston, the piston having at least one valve shaft passage disposed therethrough, the piston defining first and second hydraulic fluid chambers within the housing, the chambers having volumes varying according to movement of the rods and piston within the cylinder housing, the trailer wheels being aligned straight with the tow vehicle when the piston is centered between the end caps; and
    at least one valve shaft disposed within the axle lock cylinder, the at least one valve shaft extending axially between the end caps, the valve shaft passing through the valve shaft passage of the piston, the valve shaft having mutually opposed first and second relief portions defined therein and a seal portion disposed centrally between the relief portions, the seal portion selectively blocking hydraulic fluid flow through the piston when the piston is substantially centered in the cylinder housing so that the seal portion is seated in the valve shaft passage in the piston, the seal portion allowing hydraulic fluid flow along the relief portions and through the piston when the piston is axially offset within the cylinder housing so that the seal portion is not seated in the valve shaft passage.

11. The trailer steering mechanism and steerable trailer according to claim 10, further including first and second helical springs coaxially disposed upon the front and rear rods, respectively, external to the housing, the front and rear rods having a distal end and a flange around the distal end, the springs being disposed between the end caps and the flanges, the spring biasing the piston to the center of the cylinder housing.

12. The trailer steering mechanism and steerable trailer according to claim 8, wherein the control valve further includes:
    first and second flow passages selectively connected to the steering cylinder;
    first and second flow blocking ports selectively connected to the steering cylinder;
    third and fourth flow passages selectively connected to the axle lock cylinder;
    third and fourth flow blocking ports selectively connected to the axle lock cylinder; and
    a selector valve, the selector valve having a forward operating position simultaneously connecting the first and second flow passages to the steering cylinder and the third and fourth flow blocking ports to the axle lock cylinder, and a backing operating position simultaneously connecting the first and second flow blocking ports to the steering cylinder and the third and fourth flow passages to the axle lock cylinder.

13. The trailer steering mechanism and steerable trailer according to claim 12, further including a plurality of pressure relief valves disposed within the first and second flow blocking ports to the steering cylinder and within the third and fourth flow blocking ports to the axle lock cylinder.

14. A trailer steering kit for a trailer, the trailer having a frame, a rigid tongue pivotally attachable to a tow vehicle, and at least one axle laterally disposed across the frame, the axle having first and second wheel spindles extending therefrom, the spindles each having a wheel removably attached thereto, the trailer steering kit comprising;
    a hydraulic steering cylinder having a selectively extendable rod and a cylinder base opposite the rod, the rod having a tow vehicle connection end;
    a double-rod hydraulic axle lock cylinder adapted for being immovably affixed to the trailer frame, the axle lock cylinder having a front rod directly to connected to the cylinder base of the steering cylinder and a rear rod;
    a hydraulic control valve adapted for operable connection with the steering cylinder and the axle lock cylinder;
    a steering linkage adapted for attachment to the axle of the trailer frame, the rear rod being attached to the steering linkage; and
    first and second steering hubs adapted for installation upon the wheel spindles, the hubs being connected to the steering linkage.

15. The trailer steering kit according to claim 14, further including a trailer, the trailer having a frame and at least one axle laterally disposed across the frame, the axle having first and second steerable wheels extending therefrom, the frame having a rigid tongue pivotally attachable to a tow vehicle.

16. The trailer steering kit according to claim 14, wherein the axle lock cylinder comprises:
    an elongated cylindrical housing having end caps at opposing ends of the housing, the front and rear rods being slidably disposed through the end caps;

a piston slidably disposed within the housing, the front and rear rods extending from the piston, the piston having at least one valve shaft passage disposed therethrough, the piston defining first and second hydraulic fluid chambers within the housing, the chambers having volumes varying according to movement of the rods and piston within the cylinder housing, the trailer wheels being aligned straight with the tow vehicle when the piston is centered between the end caps; and at least one valve shaft disposed within the axle lock cylinder, the at least one valve shaft extending axially between the end caps, the valve shaft passing through the valve shaft passage of the piston, the valve shaft having mutually opposed first and second relief portions defined therein and a seal portion disposed centrally between the relief portions, the seal portion selectively blocking hydraulic fluid flow through the piston when the piston is substantially centered in the cylinder housing so that the seal portion is seated in the valve shaft passage in the piston, the seal portion allowing hydraulic fluid flow along the relief portions and through the piston when the piston is axially offset within the cylinder housing so that the seal portion is not seated in the valve shaft passage.

17. The trailer steering kit according to claim 16, further including first and second helical springs coaxially disposed upon the front and rear rods, respectively, external to the housing, the front and rear rods having a distal end and a flange around the distal end, the springs being disposed between the end caps and the flanges, the spring biasing the piston to the center of the cylinder housing.

18. The trailer steering kit according to claim 14, wherein the control valve further includes:
   first and second flow passages selectively connected to the steering cylinder;
   first and second flow blocking ports selectively connected to the steering cylinder;
   third and fourth flow passages selectively connected to the axle lock cylinder;
   third and fourth flow blocking ports selectively connected to the axle lock cylinder; and
   a selector valve, the selector valve having a forward operating position simultaneously connecting the first and second flow passages to the steering cylinder and the third and fourth flow blocking ports to the axle lock cylinder, and a backing operating position simultaneously connecting the first and second flow blocking ports to the steering cylinder and the third and fourth flow passages to the axle lock cylinder.

19. The trailer steering kit according to claim 18, further including a plurality of pressure relief valves disposed within the first and second flow blocking ports to the steering cylinder and within the third and fourth flow blocking ports to the axle lock cylinder.

* * * * *